(12) United States Patent
Huda et al.

(10) Patent No.: US 11,148,082 B2
(45) Date of Patent: Oct. 19, 2021

(54) FLUID PURIFICATION DEVICE

(71) Applicant: Unger Marketing International, LLC, Bridgeport, CT (US)

(72) Inventors: Stephen P. Huda, Shelton, CT (US); Paul H. Adams, Monroe, CT (US); Robert F. Smith, Waterbury, CT (US); Qinxue Zhuo, Suzhou (CN); Joseph K. Patterson, Monroe, CT (US)

(73) Assignee: UNGER MARKETING INTERNATIONAL, LLC, Bridgeport, CT (US)

( * ) Notice: Subject to any disclaimer, the term of this patent is extended or adjusted under 35 U.S.C. 154(b) by 329 days.

(21) Appl. No.: 16/287,178

(22) Filed: Feb. 27, 2019

(65) Prior Publication Data
US 2019/0193006 A1   Jun. 27, 2019

Related U.S. Application Data

(63) Continuation-in-part of application No. 16/177,862, filed on Nov. 1, 2018, which is a continuation-in-part
(Continued)

(51) Int. Cl.
*B01D 35/147* (2006.01)
*B01D 35/30* (2006.01)
(Continued)

(52) U.S. Cl.
CPC ......... *B01D 35/1475* (2013.01); *B01D 24/10* (2013.01); *B01D 35/30* (2013.01);
(Continued)

(58) Field of Classification Search
CPC ............ B01D 2201/34; B01D 2201/40; B01D 2201/162; B01D 2201/301;
(Continued)

(56) References Cited

U.S. PATENT DOCUMENTS

| | | |
|---|---|---|
| 429,384 A | 6/1890 | Manwaring |
| 661,339 A | 11/1900 | Grever |

(Continued)

FOREIGN PATENT DOCUMENTS

| | | |
|---|---|---|
| CA | 2964732 A1 | 10/2015 |
| CH | 351907 A | 1/1961 |

(Continued)

OTHER PUBLICATIONS

Japanese Office Action dated Jan. 24, 2020; 2 pgs.
(Continued)

*Primary Examiner* — Terry K Cecil
(74) *Attorney, Agent, or Firm* — Cantor Colburn LLP

(57) ABSTRACT

A device, system, and method for purifying a fluid is provided. The fluid purification device includes a tank, a cover and a release assembly. The tank having a hollow interior. The cover is sealingly coupled to the tank. The release assembly is pivotally coupled to the cover, the release assembly having a relief valve fluidly coupled to the hollow interior, the release assembly being movable between a first position and a second position, the relief valve being movable between an operating position, a released position and a non-operational position.

27 Claims, 21 Drawing Sheets

Related U.S. Application Data of application No. 29/615,291, filed on Aug. 28, 2017, now Pat. No. Des. 849,866, which is a continuation-in-part of application No. 14/684,071, filed on Apr. 10, 2015, now Pat. No. 10,414,671.

(51) Int. Cl.
    *B01D 24/10*     (2006.01)
    *C02F 1/00*     (2006.01)
    *C02F 103/44*     (2006.01)

(52) U.S. Cl.
    CPC ........ *C02F 1/001* (2013.01); *B01D 2201/162* (2013.01); *B01D 2201/301* (2013.01); *B01D 2201/307* (2013.01); *C02F 2103/44* (2013.01); *C02F 2201/005* (2013.01); *C02F 2201/006* (2013.01)

(58) Field of Classification Search
    CPC .............. B01D 2201/307; B01D 24/10; B01D 35/1475; B01D 35/30; B01D 36/001; C02F 1/001; C02F 2103/44; C02F 2201/005; C02F 2201/006; C02F 2201/007; F02M 37/54
    USPC .......................................... 210/120, 436, 472
    See application file for complete search history.

(56) References Cited

U.S. PATENT DOCUMENTS

| | | |
|---|---|---|
| 1,211,369 A | 1/1917 | Miller |
| 1,527,046 A | 2/1925 | Ingram |
| 2,063,086 A | 12/1936 | Fitz Gerald |
| 2,073,991 A | 3/1937 | Koser |
| 2,087,157 A | 7/1937 | Lind |
| 2,167,225 A | 7/1939 | Van Eweyk |
| 2,278,488 A | 4/1942 | Ralston |
| 2,295,708 A | 9/1942 | Raymond |
| 2,365,221 A | 12/1944 | Shafor |
| 2,367,260 A | 1/1945 | Beddoes |
| 2,525,497 A | 10/1950 | Monfried |
| 2,630,227 A | 3/1953 | Rodwell |
| 2,717,614 A | 9/1955 | Palivos |
| 2,753,302 A | 7/1956 | Cioffi |
| 3,094,043 A | 6/1963 | Powers et al. |
| D198,153 S | 5/1964 | Baker |
| 3,209,915 A | 10/1965 | Gutkowski |
| 3,266,628 A | 8/1966 | Price |
| 3,283,903 A | 11/1966 | Muller |
| 3,319,794 A | 5/1967 | Gross |
| 3,327,859 A | 6/1967 | Pall |
| 3,342,340 A | 9/1967 | Shindell |
| 3,371,792 A | 3/1968 | Weyand et al. |
| 3,402,126 A | 9/1968 | Cioffi |
| 3,442,390 A | 5/1969 | Petrucci |
| 3,497,069 A | 2/1970 | Lindenthal et al. |
| 3,517,816 A | 6/1970 | Hoppen |
| 3,561,602 A | 2/1971 | Molitor |
| 3,642,213 A | 2/1972 | Parkison et al. |
| 3,746,171 A | 7/1973 | Thomsen |
| 3,807,298 A | 4/1974 | Luke et al. |
| 3,960,092 A | 6/1976 | Newman, Jr. |
| 4,005,010 A | 1/1977 | Lunt |
| 4,048,030 A | 9/1977 | Miller |
| 4,048,064 A | 9/1977 | Clark, III |
| 4,049,548 A | 9/1977 | Dickerson |
| 4,102,473 A | 7/1978 | Draxler |
| 4,272,263 A | 6/1981 | Hancock |
| 4,368,123 A | 1/1983 | Stanley |
| 4,418,924 A | 12/1983 | Mack |
| 4,654,140 A | 3/1987 | Chen |
| 4,659,460 A | 4/1987 | Muller et al. |
| 4,728,422 A | 3/1988 | Bailey |
| 4,793,922 A | 12/1988 | Morton |
| 4,795,173 A | 1/1989 | Osborne |
| 4,877,526 A | 10/1989 | Johnson et al. |
| 4,882,050 A | 11/1989 | Kopf |
| 4,885,089 A | 12/1989 | Hankammer |
| 4,932,915 A | 6/1990 | Boris et al. |
| 4,989,636 A | 2/1991 | Hunter et al. |
| 5,006,238 A | 4/1991 | Tominaga |
| D320,273 S | 9/1991 | Heiden |
| 5,064,534 A | 11/1991 | Busch |
| 5,087,357 A | 2/1992 | Villa |
| 5,100,551 A | 3/1992 | Pall et al. |
| 5,112,503 A | 5/1992 | Raifman |
| 5,114,572 A | 5/1992 | Hunter et al. |
| 5,137,632 A | 8/1992 | Morgan, Jr. |
| 5,154,823 A | 10/1992 | Ma et al. |
| 5,236,595 A | 8/1993 | Wang et al. |
| 5,254,242 A | 10/1993 | van der Meer et al. |
| 5,288,412 A | 2/1994 | Voorhees et al. |
| 5,318,703 A | 6/1994 | Heiligman |
| 5,378,370 A | 1/1995 | Brane et al. |
| 5,510,027 A | 4/1996 | Tejeda |
| D372,760 S | 8/1996 | Brancazio |
| D374,064 S | 9/1996 | Brancazio |
| 5,558,244 A | 9/1996 | Akaike et al. |
| 5,566,611 A | 10/1996 | Scheucher et al. |
| 5,595,652 A | 1/1997 | Rainer |
| 5,605,624 A | 2/1997 | Wright |
| 5,605,632 A | 2/1997 | Jansen |
| 5,624,559 A | 4/1997 | Levin et al. |
| 5,637,214 A | 6/1997 | Kahana |
| 5,660,863 A | 8/1997 | Nakano et al. |
| 5,853,572 A | 12/1998 | Kuennen et al. |
| 5,876,600 A | 3/1999 | Matsubara et al. |
| 5,985,139 A | 11/1999 | Zoeller |
| 5,993,656 A | 11/1999 | Cordani |
| 6,068,761 A | 5/2000 | Yuen |
| 6,009,728 A | 8/2000 | Bairischer |
| 6,099,728 A | 8/2000 | Bairischer |
| 6,120,686 A | 9/2000 | Bilz |
| 6,132,612 A | 10/2000 | Bourgeois |
| 6,136,183 A | 10/2000 | Suzuki et al. |
| 6,197,193 B1 | 3/2001 | Archer |
| 6,274,055 B1 | 8/2001 | Zuk, Jr. |
| 6,343,697 B1 | 2/2002 | Hausdorf et al. |
| 6,391,097 B1 | 5/2002 | Rosenberg |
| 6,485,639 B1 | 11/2002 | Gannon et al. |
| 6,500,335 B2 | 12/2002 | Janik et al. |
| 6,610,275 B1 | 8/2003 | Owades et al. |
| 6,622,871 B2 | 9/2003 | Gabele et al. |
| D481,442 S | 10/2003 | Liu |
| 6,649,056 B2 | 11/2003 | Fritze |
| 6,685,843 B2 | 2/2004 | Leaverton |
| 6,716,348 B1 | 4/2004 | Morgan |
| 6,764,595 B1 | 7/2004 | Halemba et al. |
| 6,773,588 B2 | 8/2004 | Beeman et al. |
| D496,984 S | 10/2004 | Costa |
| D506,551 S | 6/2005 | Booth et al. |
| 6,966,444 B2 | 11/2005 | Morgan |
| 7,014,690 B2 | 3/2006 | Mitsch et al. |
| 7,147,774 B2 | 12/2006 | Jones, III |
| 7,156,994 B1 | 1/2007 | Archer |
| 7,186,338 B2 | 3/2007 | Boisvert |
| 7,243,728 B2 | 7/2007 | Stoesz et al. |
| 7,303,605 B2 | 12/2007 | Zia et al. |
| D562,431 S | 2/2008 | Brune |
| 7,357,337 B2 | 4/2008 | Farrari |
| 7,378,019 B1 | 5/2008 | Currier et al. |
| 7,459,078 B2 | 12/2008 | Klein |
| 7,566,399 B2 | 7/2009 | Kuo et al. |
| D606,420 S | 12/2009 | Shoji |
| 7,625,199 B2 | 12/2009 | Jahn et al. |
| 7,748,755 B2 | 7/2010 | Camp et al. |
| 7,850,859 B2 | 12/2010 | Tanner et al. |
| 7,963,400 B2 | 6/2011 | Stolarik et al. |
| 8,110,103 B2 | 2/2012 | Mormino et al. |
| 8,182,212 B2 | 5/2012 | Parcell |
| D661,339 S | 6/2012 | Thixton et al. |
| 8,323,493 B2 | 12/2012 | Quintel et al. |
| 8,393,262 B1 | 3/2013 | Molayem |

(56) References Cited

U.S. PATENT DOCUMENTS

| | | | |
|---|---|---|---|
| 8,464,743 | B2 | 6/2013 | King et al. |
| D692,524 | S | 10/2013 | Ziser |
| 8,815,086 | B2 | 8/2014 | Morgan |
| D740,915 | S | 10/2015 | Harrington |
| D742,997 | S | 11/2015 | Sgroi |
| D779,629 | S | 2/2017 | Kemper |
| D797,888 | S | 9/2017 | Schurmeyer |
| D798,996 | S | 10/2017 | Sgroi |
| D828,488 | S | 9/2018 | Sgroi |
| 10,088,398 | B2 * | 10/2018 | Clark .................. B01L 3/502 |
| D859,626 | S | 9/2019 | Hu |
| 10,414,671 | B2 | 9/2019 | Hirsch et al. |
| D861,847 | S | 10/2019 | Li |
| D870,258 | S | 12/2019 | Song |
| 10,829,396 | B2 | 11/2020 | Camp et al. |
| D911,486 | S | 2/2021 | Sgroi, Jr. |
| 2004/0084361 | A1 | 5/2004 | Janik et al. |
| 2004/0140251 | A1 | 7/2004 | Hsiao |
| 2004/0149666 | A1 | 8/2004 | Leaverton |
| 2004/0251191 | A1 | 12/2004 | Arianto |
| 2005/0199536 | A1 | 9/2005 | Koslow |
| 2006/0086656 | A1 | 4/2006 | Morgan |
| 2007/0000829 | A1 | 1/2007 | Boisvert |
| 2007/0235381 | A1 | 10/2007 | Tsai |
| 2008/0000820 | A1 | 1/2008 | Mitchell |
| 2008/0011669 | A1 | 1/2008 | Morgan |
| 2008/0296210 | A1 | 12/2008 | Bittner |
| 2009/0008318 | A1 | 1/2009 | Anes et al. |
| 2009/0045583 | A1 | 2/2009 | Ropponen |
| 2009/0146421 | A1 | 6/2009 | Engdahl |
| 2009/0314703 | A1 | 12/2009 | Beach et al. |
| 2010/0012590 | A1 | 1/2010 | Slark |
| 2010/0084030 | A1 | 4/2010 | Mackulin et al. |
| 2010/0126946 | A1 | 5/2010 | Morgan |
| 2010/0314301 | A1 | 12/2010 | Sloan et al. |
| 2011/0062065 | A1 | 3/2011 | McCague |
| 2011/0062066 | A1 | 3/2011 | McCague |
| 2011/0089180 | A1 | 4/2011 | Kolbasi |
| 2011/0303618 | A1 | 12/2011 | Cueman et al. |
| 2012/0085687 | A1 | 4/2012 | Simonette |
| 2012/0261325 | A1 | 10/2012 | Brown et al. |
| 2012/0261329 | A1 | 10/2012 | Quintel |
| 2012/0261359 | A1 | 10/2012 | Quintel et al. |
| 2013/0020246 | A1 | 1/2013 | Hoots et al. |
| 2013/0025447 | A1 | 1/2013 | Crowder |
| 2013/0056406 | A1 | 5/2013 | Jacobs et al. |
| 2013/0277298 | A1 | 10/2013 | Sanocki et al. |
| 2014/0027361 | A1 | 1/2014 | Pennington |
| 2015/0107205 | A1 | 4/2015 | Hartog |
| 2015/0353383 | A1 | 12/2015 | Hirsch et al. |
| 2017/0197854 | A1 | 7/2017 | Chandler, Jr. et al. |
| 2018/0194646 | A1 | 7/2018 | Camp |
| 2019/0070535 | A1 | 3/2019 | Patterson |
| 2019/0193006 | A1 | 6/2019 | Huda et al. |
| 2020/0001214 | A1 | 1/2020 | Adams |
| 2020/0010338 | A1 | 1/2020 | Hirsch et al. |
| 2021/0024380 | A1 | 1/2021 | Camp et al. |

FOREIGN PATENT DOCUMENTS

| | | | |
|---|---|---|---|
| CN | 105709492 | A | 6/2016 |
| DE | 360195 | A1 | 12/1952 |
| DE | 2020929 | A1 | 1/1972 |
| DE | 2364504 | A1 | 8/1974 |
| DE | 2608408 | A1 | 11/1976 |
| DE | 2531850 | A1 | 1/1977 |
| DE | 3207511 | A1 | 9/1983 |
| DE | 3624414 | A1 | 1/1988 |
| DE | 4136852 | A1 | 5/1993 |
| DE | 4325114 | C1 | 11/1994 |
| DE | M97016860001 | A1 | 8/1997 |
| DE | 39411911 | T2 | 2/1999 |
| DE | 20022322 | U1 | 7/2001 |
| DE | 10305632 | A1 | 11/2003 |
| DE | 202006002737 | U1 | 4/2006 |
| EM | 0003898380031 | B1 | 8/2005 |
| EM | 0003898380032 | B1 | 10/2005 |
| EP | 1221429 | A1 | 11/1999 |
| EP | 1626936 | A1 | 2/2006 |
| EP | 1728767 | A1 | 12/2006 |
| EP | 0676010 | B1 | 7/2010 |
| EP | 2969106 | A1 | 1/2016 |
| EP | 3056276 | A2 | 8/2016 |
| EP | 3070058 | A1 | 9/2016 |
| EP | 3214046 | A1 | 9/2017 |
| EP | 3372558 | A1 | 9/2018 |
| FR | 2636940 | A1 | 3/1990 |
| GB | 525643 | A | 9/1940 |
| GB | 1296051 | A1 | 3/1969 |
| GB | 1404267 | A1 | 8/1975 |
| GB | 1441269 | A | 6/1976 |
| GB | 1543590 | A1 | 4/1979 |
| GB | 2206292 | A | 1/1989 |
| GB | 2222536 | A | 3/1990 |
| JP | H07163820 | A | 6/1995 |
| JP | H1190427 | A1 | 4/1999 |
| JP | 2005138064 | A | 6/2005 |
| NL | 3204637 | A1 | 6/1984 |
| WO | 2003064290 | A1 | 8/2003 |
| WO | 2004110938 | A2 | 12/2004 |
| WO | 2005115924 | A2 | 12/2005 |
| WO | 2010010574 | A1 | 1/2010 |
| WO | 2010081075 | A1 | 1/2010 |
| WO | 2013103765 | A1 | 7/2013 |
| WO | 2015157680 | A1 | 10/2015 |
| WO | 2016068746 | A1 | 5/2016 |
| WO | 2018067437 | A1 | 4/2018 |

OTHER PUBLICATIONS

European Search Report for Application No. 19205920.2 dated Dec. 9, 2019; 6 pgs.

European Search Report for Application No. 19181177.7 dated Dec. 9, 2019; 9 pgs.

Susan Selke: "Packaging: Polymers in Flexible Packaging", Encyclopedia of Materials: Science and Technology (Second Edition), Dec. 31, 2001 (Dec. 31, 2001), pp. 6652-6656, XP055742846, Retrieved from the Internet URL:https://www.sciencedirect.com/sdfe/pdf/download/eid/3-s2.0-B0080431526011761/first-page-pdf [retrieved on Oct. 22, 2020].

U.S. Final Office Action; U.S. Appl. No. 16/177,862, filed Nov. 1, 2018; dated Jun. 16, 2020; 19 pages.

Walt Disney's Donald Duck No. 379 (Front Page, p. 1 and p. 73; published 1987).

"Componenti Per Addolcitori/Water Softeners Components," ITA/NIG-CAT-801, dated Apr. 2009, 6 Pages.

Application for Invalidation dated Sep. 28, 2016 in European Community Registration EU 002555425-0002.

Lustiges Taschenbuch No. 210 (front page, pp. 2, 3, 218, 219, 238, 239, 240, 241, published 1995).

Penquin Filter Pump Industries, "In-Tank & Out-Tank Filtration Systems", https://filterpump.com, Jul. 2010 (Jul. 2010)—refer to BF Bag Filtration Systems.

Walt Disney's Donald Duck No. 378 (Front page, p. 1; published 1987).

Communication pursuant to Article 94(3) EPC; International Application No. 1918177.7-1101; International Filing Date: Jun. 19, 2019; dated Apr. 19, 2021; 5 pages.

Communication pursuant to Article 94(3) EPC; International Application No. 19205920.2-1101; International Filing Date: Oct. 29, 2019; dated Apr. 21, 2021; 4 pages.

* cited by examiner

FLUID PURIFICATION DEVICE

CROSS-REFERENCE TO RELATED APPLICATIONS

The present application is a continuation-in-part application of U.S. application Ser. No. 16/177,862 entitled "Fluid Purification Device" filed on Nov. 1, 2018, which is a continuation-in-part Application of U.S. application Ser. No. 29/615,291 entitled "Water Purification Device" filed on Aug. 28, 2017, and is also a continuation in part of U.S. application Ser. No. 14/684,071 filed on Apr. 10, 2015, the contents of all of which are incorporated by reference herein.

BACKGROUND

The subject matter disclosed herein relates to a fluid purification device, and in particular to a fluid purification device having a replaceable media module.

It is desirable to use purified water (referred to herein as "pure water") in various cleaning applications. One common cleaning application for pure water is the cleaning of windows, cars, buildings, solar panels, and other surfaces. For example, the use of pure water in the form of deionized (DI) water, also known as demineralized (DM) water, has been found to be effective when cleaning smooth or reflective surfaces such as automobiles. The pure water can reduce the formation water marks and spots, which can be formed by impurities in untreated water that remain on the surface when the water dries.

Many pure water systems use one or more types of purification media either alone or in combination with other devices/processes such as, but not limited to, particle filtration, distilling (i.e., distilled water), reverse osmosis, desalination, carbon filtration, microfiltration, ultrafiltration, ultraviolet oxidation, electrodialysis, nanofilteration, others, and any combinations thereof.

Some pure water systems improve the ease of replacing depleted or spent purification media by providing media purification devices that contain or house the purification media. Still further pure water systems condition the water by adding to or removing one or more components from the input water.

Accordingly, while existing water conditioning systems are suitable for their intended purposes the need for improvement remains, particularly in providing a fluid purification system having the features described herein.

BRIEF DESCRIPTION

According to one aspect of the disclosure a fluid purification device is provided. The fluid purification device includes a tank, a cover and a release assembly. The tank having a hollow interior. The cover is sealingly coupled to the tank. The release assembly is pivotally coupled to the cover, the release assembly having a relief valve fluidly coupled to the hollow interior, the release assembly being movable between a first position and a second position, the relief valve being movable between an operating position, a released position and a non-operational position.

Additionally or alternatively, in this or other embodiments the tank includes a lock feature. The release assembly includes a lock member that is engaged with the lock feature in the operating position and non-operating position, the lock member being rotated away from and disengaged from the lock feature in the released position. The relief valve opens and the lock member disengages simultaneously when the release assembly rotates from the operating position to the released position.

Additionally or alternatively, in this or other embodiments a lever coupled between the lock member and the relief valve, the lever having a portion operably coupled to the relief valve. Wherein the relief valve further includes a valve member having a cup portion disposed on a first end, and an opposing second end of the valve member being in selective engagement with the lever. Additionally or alternatively, in this or other embodiments a first seal member operably disposed between the cup portion and one of the cover or tank, the first seal member being in sealing engagement with the cup portion and the one of the cover or tank when in the operating position. Additionally or alternatively, in this or other embodiments a cap member coupled to the second end. A second seal member is operably disposed between the cap member and the one of the cover or tank, the second deal member being in sealing engagement with the one of the cover or tank when in the non-operational position and the released position.

Additionally or alternatively, in this or other embodiments the cup portion includes a recessed area on one end, the recessed area having an opening that faces the hollow interior of the tank. Additionally or alternatively, in this or other embodiments a biasing member coupled between the cup portion and the cover, the biasing member biasing the valve member into the non-operational position. Additionally or alternatively, in this or other embodiments the biasing member applies a force of between 1-900 grams to the valve member, a force of 2-450 grams to the valve member, a force or 5-100 grams to the valve member, or a force of 21 grams to the valve member.

Additionally or alternatively, in this or other embodiments the ratio of surface area of the cup portion to the spring force is between 0.1-64 $mm^2/gram$, 0.1-32 $mm^2/gram$, 0.6-13 $mm^2/gram$, or 3 $mm^2/gram$.

According to another aspect of the disclosure a fluid purification device is provided. The device includes a tank, a cover, a lever and a relieve valve. The tank having a hollow interior. The cover is sealingly coupled to the tank. The lever is movably coupled to one of the cover or the tank. The relief valve is operably coupled to the lever, the relief valve having a valve member with a cup portion disposed on an end, the relief valve defining a fluid path between the hollow interior and an environment when in an open position. A biasing member is operably coupled to the relief valve, the biasing member biasing the valve member to the open position when the cup portion is not in contact with a fluid.

Additionally or alternatively, in this or other embodiments a first seal member operably disposed between the one of the cover or tank and the cup portion, the first seal member sealing the hollowing interior from the environment when the cup portion is in contact with a fluid. Additionally or alternatively, in this or other embodiments the release assembly further includes a cap coupled to an end of the valve member opposite the cup portion. Additionally or alternatively, in this or other embodiments a second seal operably disposed between the one of the cover or tank and the cap.

Additionally or alternatively, in this or other embodiments the biasing member applies a force of between 1-900 grams to the valve member, a force between 2-450 grams to the valve member, a force between 5-100 grams to the valve member, or a force of about 21 grams to the valve member. Additionally or alternatively, in this or other embodiments the ratio of surface area of the cup portion to the spring force is between 0.1-64 mm$^2$/gram, 0.1-32 mm$^2$/gram, 0.6-13 mm$^2$/gram, or about 3 mm$^2$/gram.

According to another aspect of the disclosure, a method of operating a fluid purification device is provided. The method including biasing a relief valve into a non-operational position, the relief valve providing a fluid path between a hollow interior of a tank and an exterior of the fluid purification device. The relief valve is closed in response to the tank being filled with the fluid. The hollow interior is pressurized during operation. The hollow interior is de-pressurized and a cover unlocked in response to moving the relief valve to a released position.

Additionally or alternatively, in this or other embodiments the closing of the relief valve includes applying a pressure with the fluid to a cup portion of the relief valve. Additionally or alternatively, in this or other embodiments the de-pressurizing of the hollow interior and unlocking of the cover occurs simultaneously. Additionally or alternatively, in this or other embodiments the relief valve moves to the non-operational position in response to the hollow interior not being in contact with a fluid.

Additionally or alternatively, in this or other embodiments the relief valve is sealed with a first seal when in the operational position. Additionally or alternatively, in this or other embodiments the relief valve is sealed with a second seal when in the non-operational position. Additionally or alternatively, in this or other embodiments a ratio of a surface area of the relief valve to a biasing force on the relief valve is about 3 mm$^2$/gram.

According to another aspect of the disclosure, a fluid purification system is provided. The system includes a tank having a first port and a hollow interior. A purification device is disposed at least partially within the hollow interior. A cover is sealingly coupled to the tank, the cover assembly having a second port fluidly coupled to the purification device. A release assembly is pivotally coupled to the cover, the release assembly having a relief valve fluidly coupled to the hollow interior, the release assembly being rotatable between a first position and a second position, the relief valve being movable between an operating position, a released position and a non-operational position.

Additionally or alternatively, in this or other embodiments the tank includes a lock feature. The release assembly includes a lock member that is engaged with the lock feature in the operating position and non-operating position, the lock member being rotated away from and disengaged from the lock feature in the released position. The relief valve opens and the lock member disengages simultaneously when the release assembly rotates from the operating position or non-operational position to the released position.

Additionally or alternatively, in this or other embodiments a lever is coupled between the lock member and the relief valve, the lever having a portion operably coupled to the relief valve. Wherein the relief valve further includes a valve member having a cup portion disposed on a first end, and an opposing second end of the valve member being in selective engagement with the lever.

Additionally or alternatively, in this or other embodiments a first seal member operably disposed between the cup portion and one of the cover or tank, the first seal member being in sealing engagement with the cup portion and the one of the cover or tank when in the operating position. Additionally or alternatively, in this or other embodiments a cap member coupled to the second end. A second seal member operably disposed between the cap member and the one of the cover or tank, the second deal member being in sealing engagement with the one of the cover or tank when in the non-operational position and the released position.

Additionally or alternatively, in this or other embodiments the cup portion includes a recessed area on one end, the recessed area having an opening that faces the hollow interior of the tank. Additionally or alternatively, in this or other embodiments a biasing member coupled between the cup portion and the cover, the biasing member biasing the valve member into the non-operational position.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure are directed to a fluid purification system such as that used to condition or generate pure water. Embodiments provide technical effect in a release and lock assembly that simultaneously release pressure from an interior of the system and unlock a cover assembly.

Figure 1:
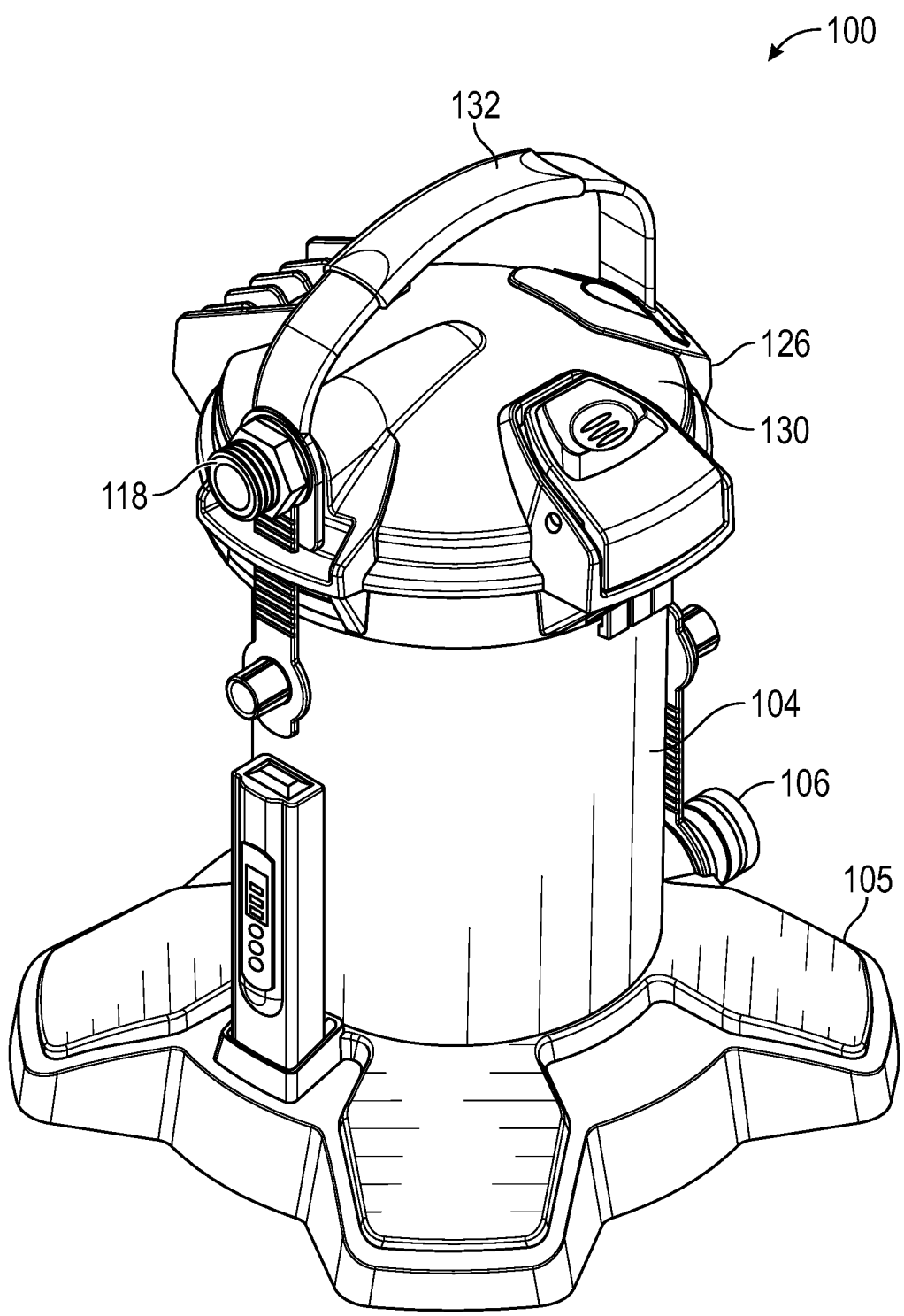
FIG. 1 is a perspective view of a fluid purification device according to an embodiment.
Figure 2:
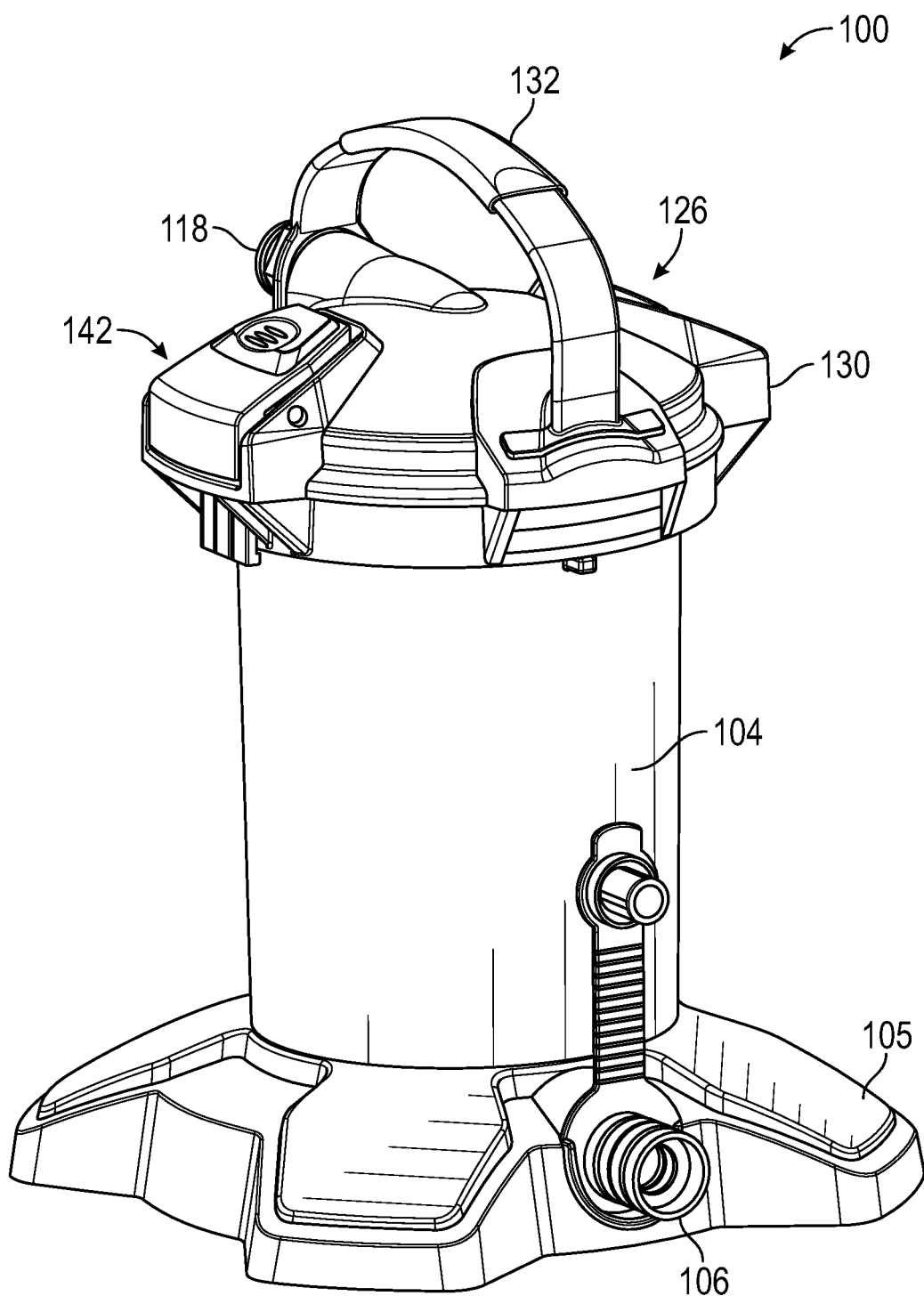
FIG. 2 is another perspective view of the fluid purification device of FIG. 1.
Figure 3:
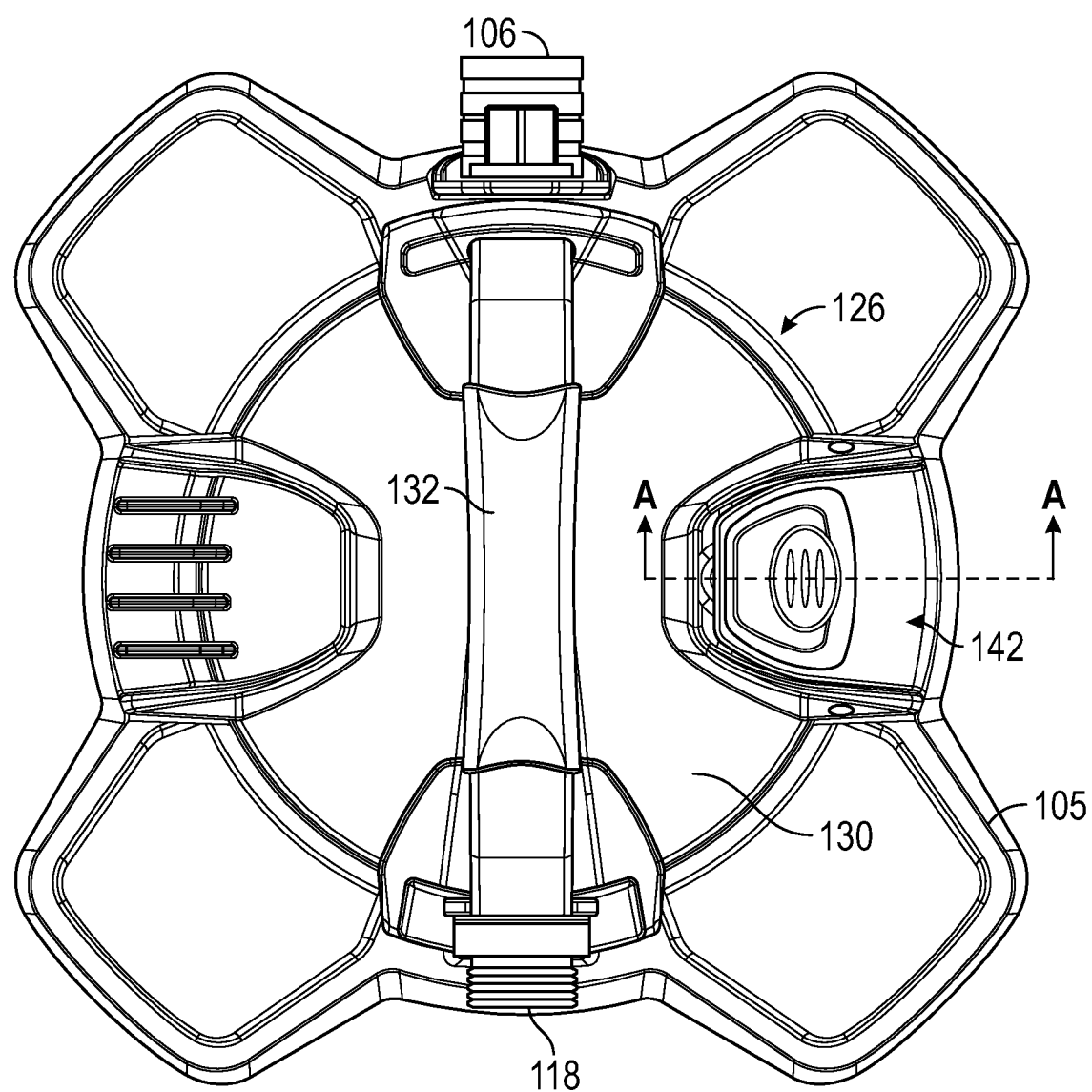
FIG. 3 is a top view of the fluid purification device of FIG. 1.
Figure 4:
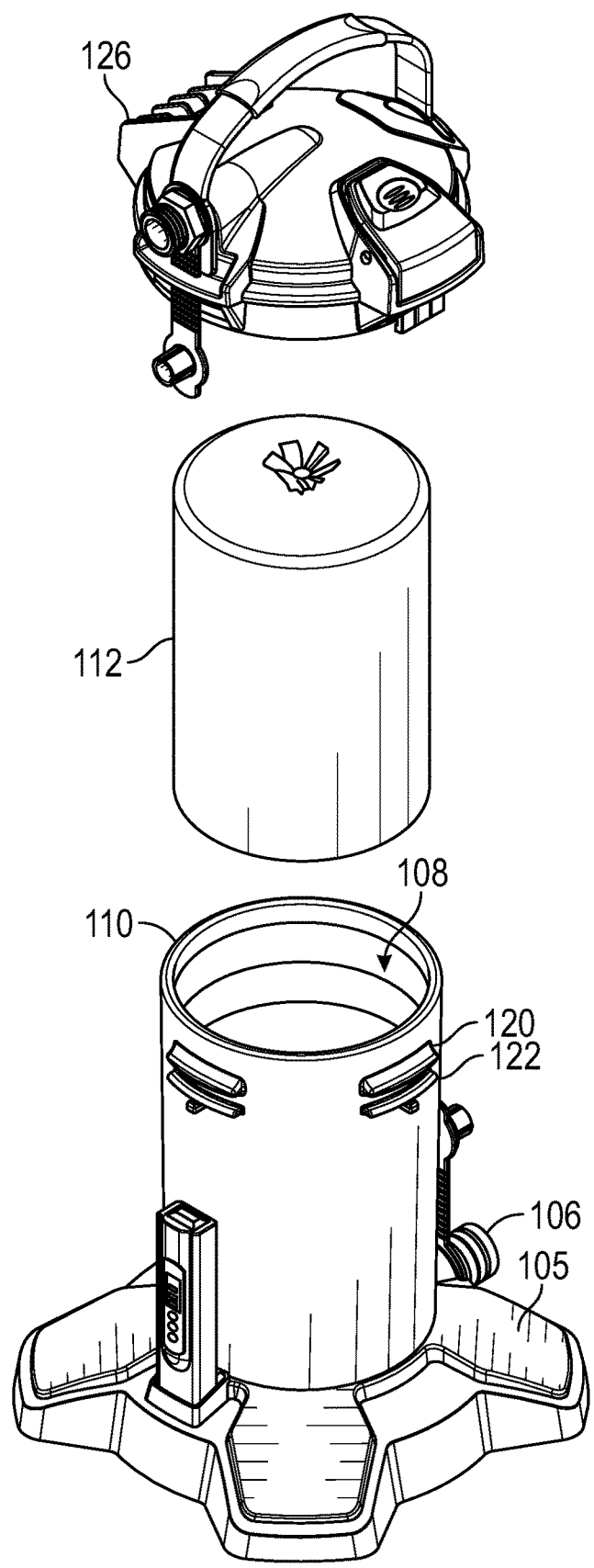
FIG. 4 is a perspective unassembled view of the fluid purification device of FIG. 1.

Referring now to FIG. 1, an embodiment is shown of a fluid purification system 100. It should be appreciated that while the illustrated embodiment may refer to the fluid purification system 100 as generating pure water for use in cleaning applications, this is for exemplary purposes and the claims should not be so limited in other embodiments, the fluid purification system 100 may be used in other applications, such as for conditioning water for using in washing vehicles. The system 100 includes a base 102 that holds and supports a tank 104. The tank 104 includes an inlet port 106 and a hollow interior 108 (FIG. 4). The tank 104 includes an open end 110 (FIG. 4).

Figure 20A:
FIG. 20A and FIG. 20B are perspective and side illustrations of the media module of FIG. 4 in a free or resting state.
Figure 20B:
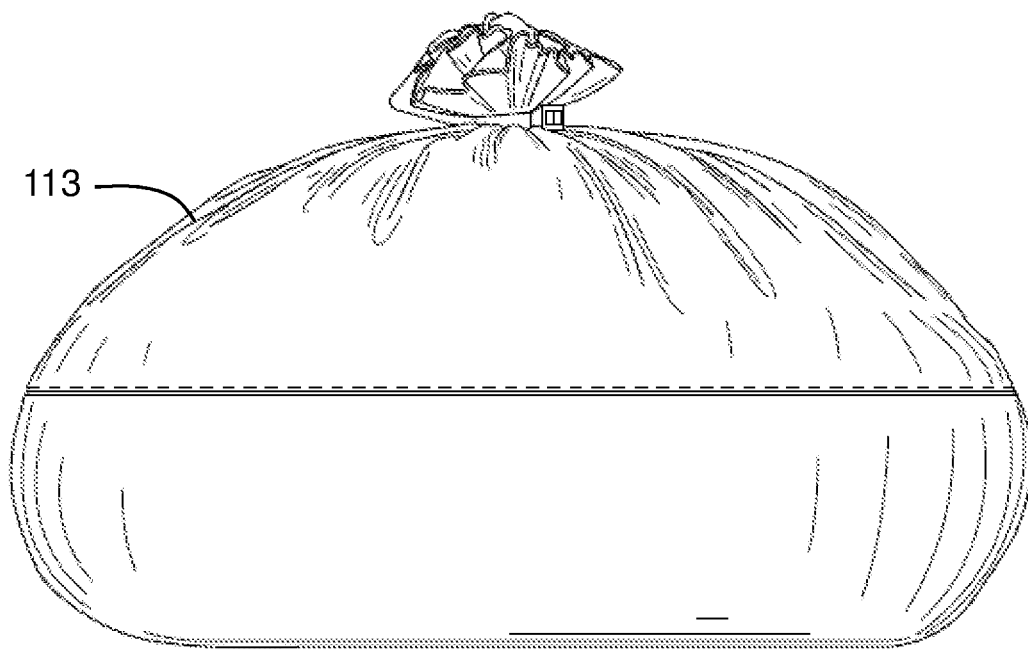

The hollow interior 108 includes an inner surface having a diameter sized to receive a replaceable media module 112. The media module includes a purification media 113 (FIG. 20A) that is under compression when the module is inserted into the hollow interior 108. It should be appreciated that while embodiments herein describe the hollow interior 108 as being circular, this is for exemplary purposes and the claims should not be so limited. In one or more embodiments described herein, the interior 108 may be any suitable shape, such as but not limited to square, rectangular, oval, or a polygon for example.

It should be appreciated that while embodiments herein may describe the port 106 as being an "inlet" and the port 118 as being the "outlet," this is for example purposes and the claims should not be so limited. In other embodiments, the flow of fluid may be reversed, with the port 118 being the "inlet" and the port 106 being the "outlet."

In an embodiment, the module 112 includes an initial volume of purification media. As the system 100 is operated, such as to generate pure water for example, the water will pass through the media to become purified. As used herein, the terms "pure", "purified", and "purification" includes the removal of one or more components and/or the addition of one or more components from water or any other fluid. The components removed or added can include soluble and/or insoluble materials such as, but not limited to minerals, salts, suspended particles, bacteria, and others, where the soluble components are often referred to as total dissolved solids or TDS.

During operation, the purification of the fluid will cause the purification media to gradually deplete. As the purification media depletes, it also reduces in volume. As used herein, the term "depleted volume" means an operating condition where the output water (e.g. at the outlet port 118) has a TDS level that is substantially the same as the input water. It has been found that the depleted volume is about 10-20% less than the initial volume. Therefore, in the illustrated embodiment, the initial volume of purification media is selected to allow a 20% reduction in volume and still be under compression when at the depleted volume.

In an embodiment, the purification media is contained by a member made from a thin porous, flexible, and/or elastic material. In an embodiment, at least one of the material is both porous and elastic. In other embodiments, at least one of the material is both porous and flexible. In some such embodiments, member may be formed from a material that has 5%-25% elastane and 75%-95% Nylon, preferably a material formed from between 10%-20 elastane and between 80%-90% Nylon, or with 15% elastane and 85% Nylon being desired, and any subranges therebetween. In one embodiment, the flexible bag may be 100% nylon or polyamide (PA).

In the illustrated embodiment, the replaceable media module 112 is tubular in shape after inserted into the tank 104. It should be appreciated that due to the elastic properties of the first member 202, the module 112 may have a bulbous shape when placed on a surface outside of the tank 104. In other embodiments where the module 112 has a member that is flexible, but has relative low elasticity, the module 112 may have relatively straight sides (e.g. non-bulbous) when placed on a surface outside of the tank 104. In some embodiments where module 112 is configured for use with the tank 104, which has an internal diameter of 130 mm, the module 112 may have an outer diameter of between 100 mm and 300 mm, or between about 140 mm to 250 mm, and any subranges therebetween. In this manner, the module 112 has outer diameter that is within ±20%, or within −10% to 0%, with about −4% of the inner diameter of the hollow interior 108 being desired, and any subranges therebetween.

The tank includes a plurality of radial pins or ribs 120, 122 (FIG. 5), with the first plurality of ribs 120 being closer to the open end 110. The second plurality of ribs 122 includes a projection 124 that extends radially outward from each rib 122. In the illustrated embodiment, the projection 124 is centrally located on each rib 122. As will be discussed in more detail herein, the ribs 120, 122 are sized and positioned to engage slots within a cover assembly 126. Further, it should be appreciated that while the illustrated embodiment shows the ribs 120, 122 as being positioned on the outer diameter of the tank 104, in other embodiments the ribs 120, 122 may be positioned on the inside diameter of the tank 104. Further in other embodiments, the tank 104 includes slots and the cover assembly 126 includes corresponding ribs.

Figure 9:
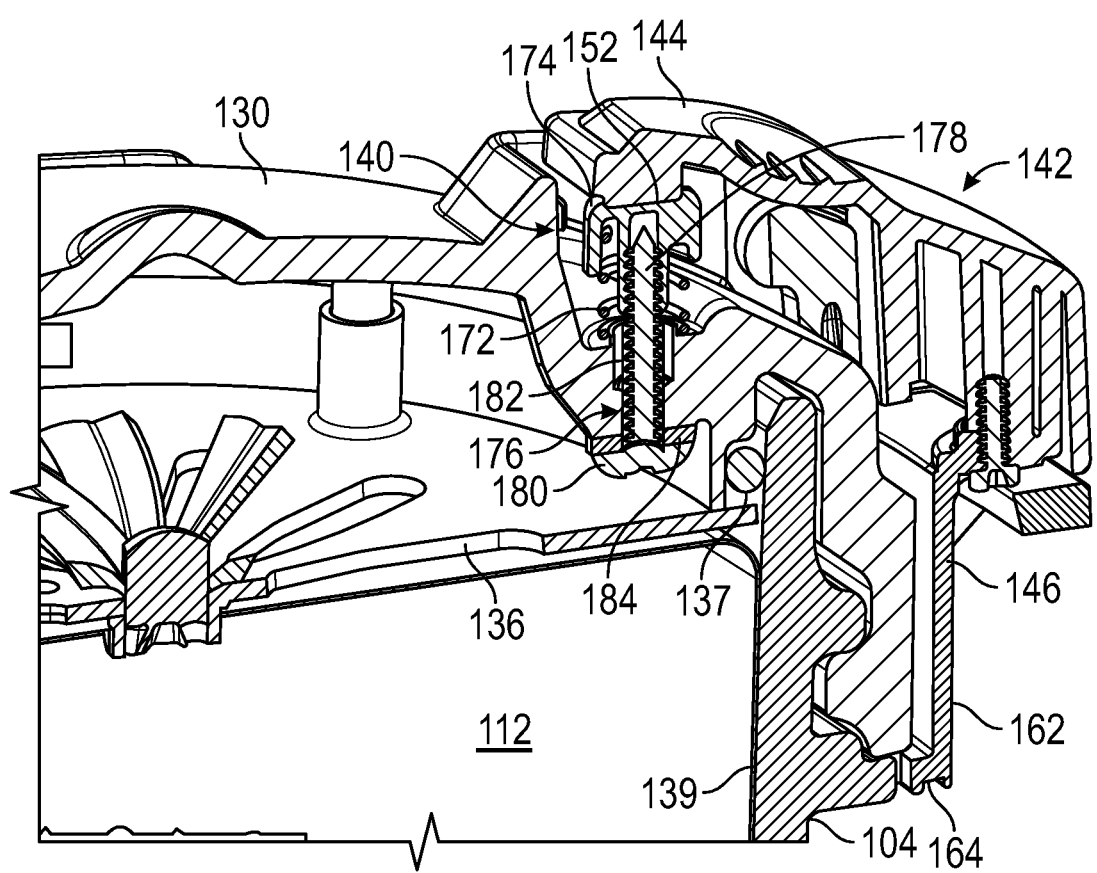
FIG. 9 is a partial perspective sectional view taken along the line A-A of FIG. 3, in accordance with an embodiment.

Referring now to FIGS. 1-6, the cover assembly 126 is shown. The cover assembly 126 is sized to cover and seal against the tank 104 when the ribs 120, 122 engage the slots 128 (FIG. 6) with an o-ring 137 (FIG. 9). The cover assembly 126 includes a body 130 with a handle 132 coupled thereto. The body 130 includes a hollow interior portion 134 that is in fluidly communication with the hollow interior 108 of the tank 104. In an embodiment, a diffuser element 136 may be coupled to the body 130. A port 118 is in fluid communication with the hollow interior 108. The port 118 may be an outlet port that transfers conditioned water from the system 100 to the end use application.

In the illustrated embodiment, the cover assembly 126 includes the slots 128 formed on the inside diameter of the hollow interior portion 134. When the cover assembly 126 is placed on the tank 104 and rotated with respect to each other about the longitudinal axis of the system 100, the ribs 120 are received in the slots 128 so as to form a fluid seal between the tank 104 and the cover assembly 126.

Referring now to FIGS. 7-11, the cover assembly 126 further includes a pressure relief valve 140 and a release assembly 142. The release assembly 142 includes a lever 144 and a locking member 146. In the illustrated embodiment, the lever 144 and locking member 146 are two separate components that are fixedly coupled to each other. It should be appreciated that in other embodiments, the lever 144 and locking member 146 may be fabricated as a single component. The release assembly 142 is pivotally coupled to the body 130 about an axis 148.

Figure 5:
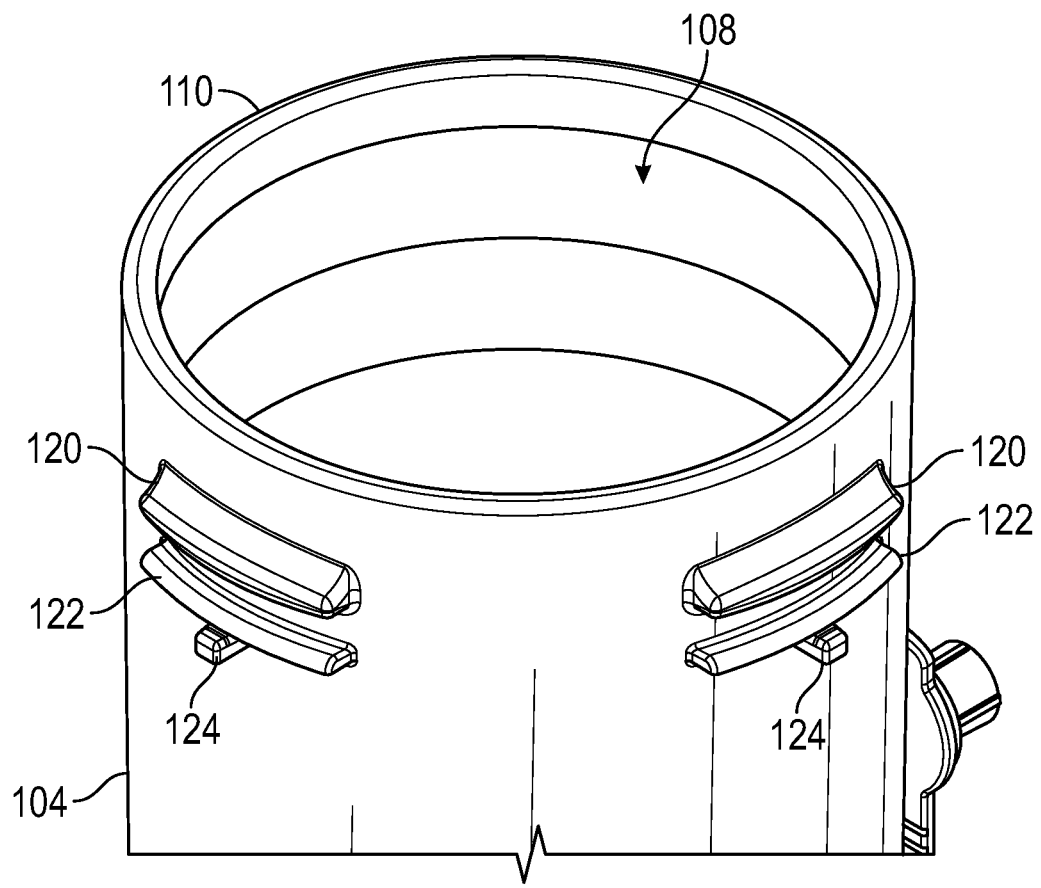
FIG. 5 is a partial perspective view of a tank portion of the fluid purification device of FIG. 1.
Figure 6:
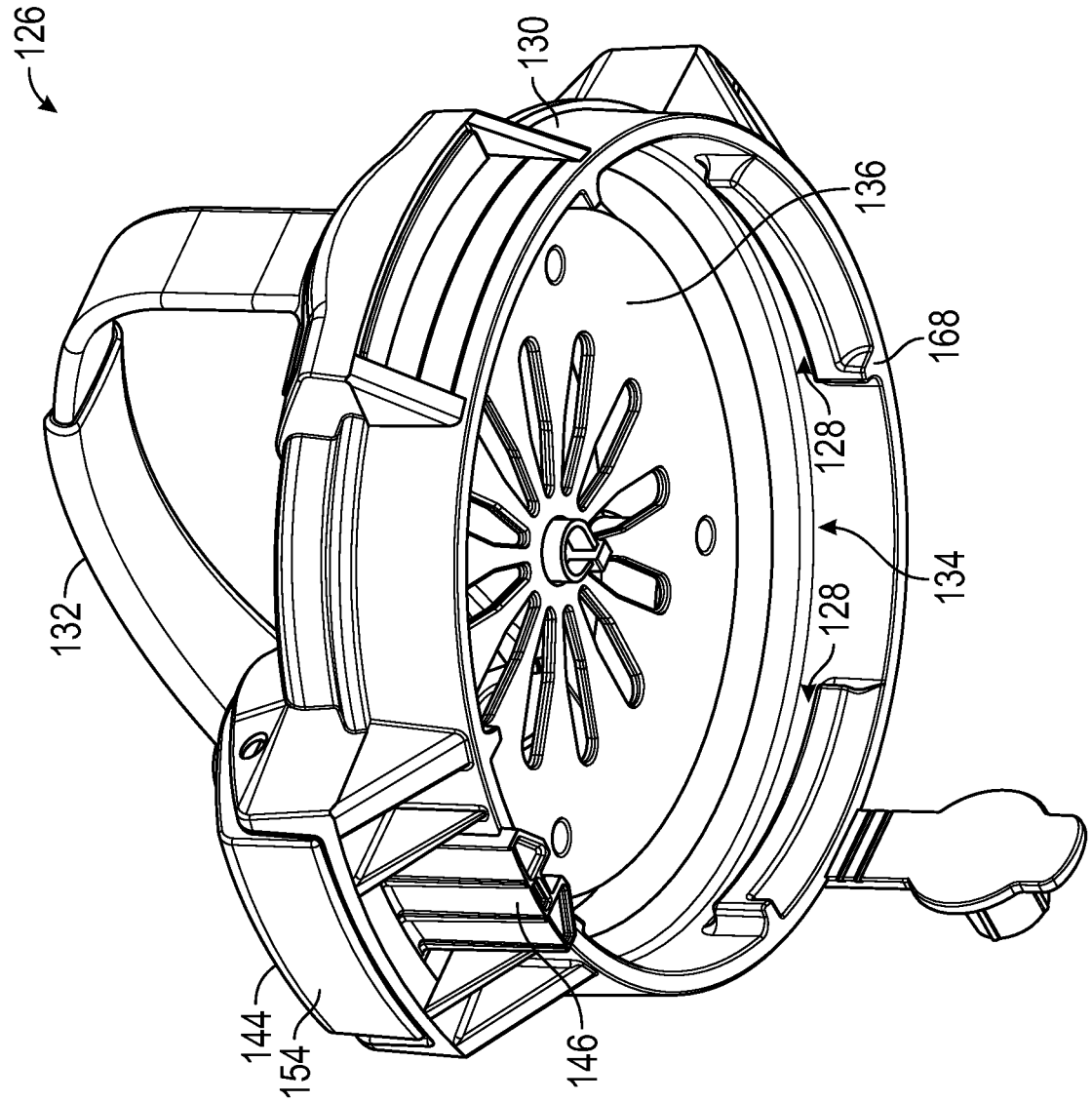
FIG. 6 is a bottom perspective view of a cover assembly of the fluid purification device of FIG. 1.
Figure 7:
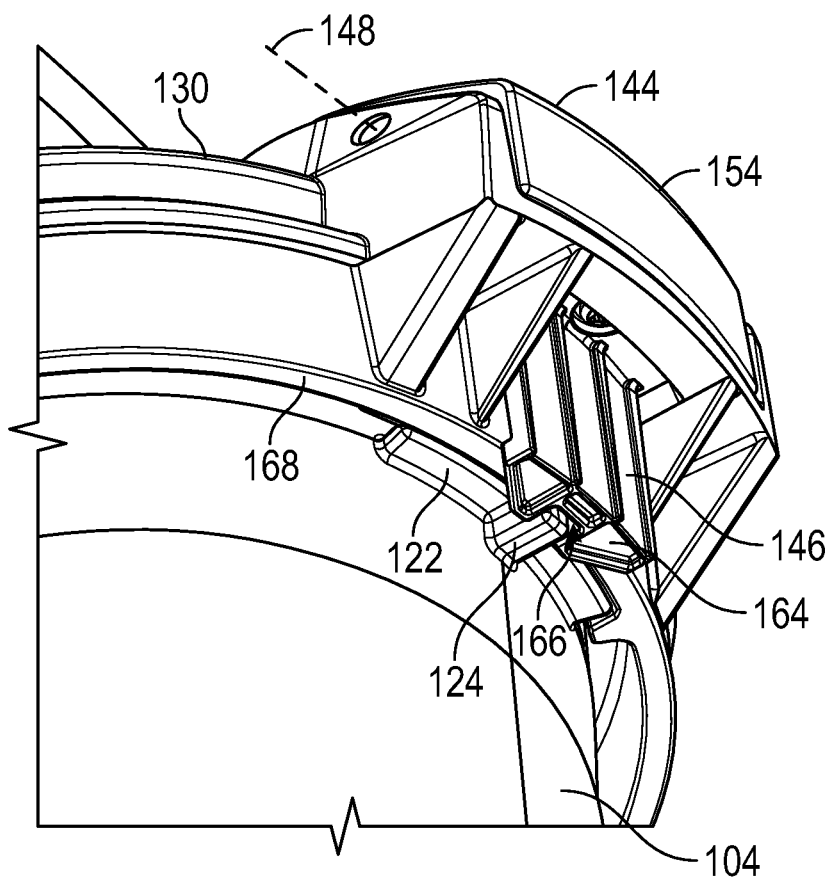
FIG. 7 is a partial perspective view of a release and lock assembly of the fluid purification device of FIG. 1.
Figure 8:
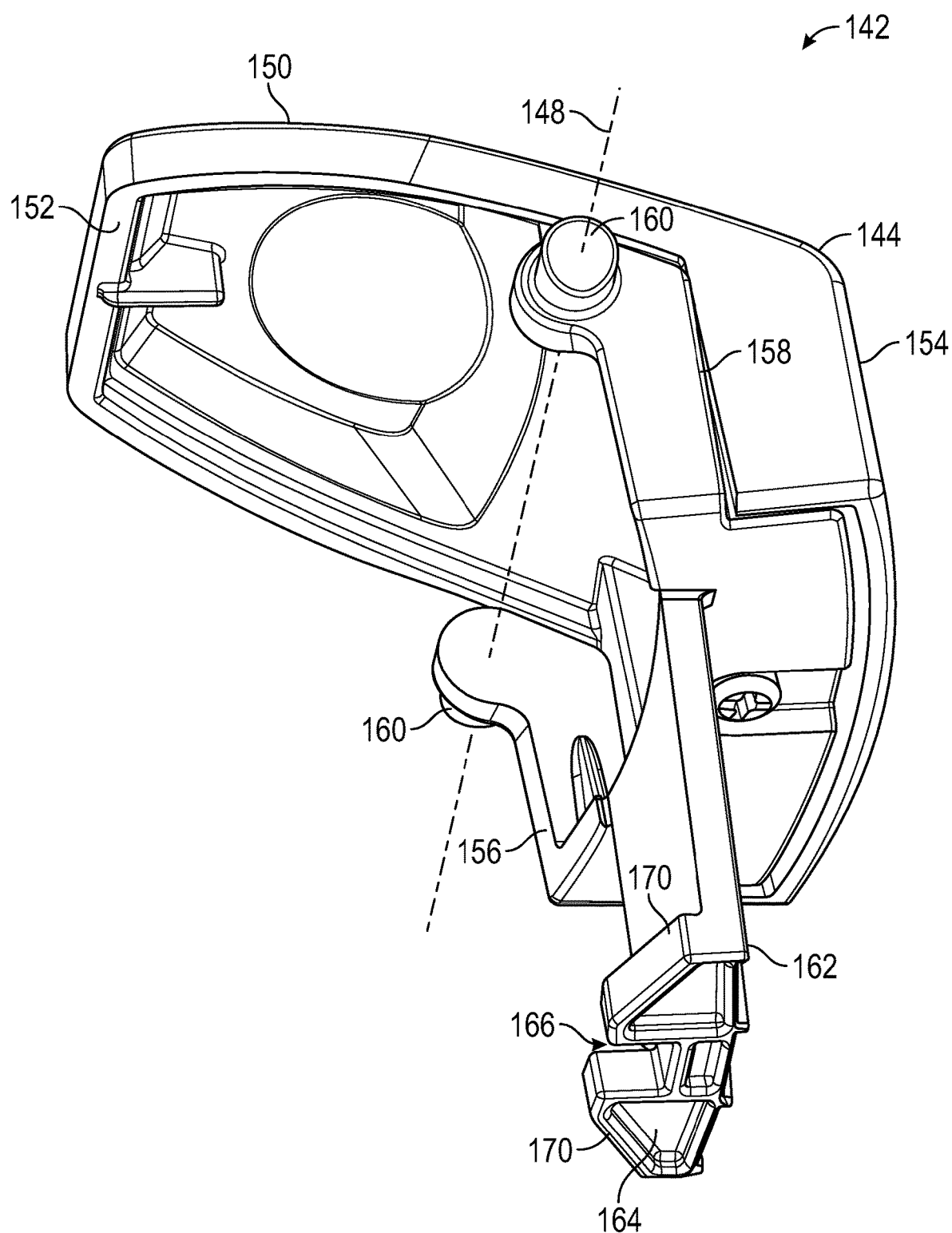
FIG. 8 is a perspective view of the release and lock assembly of FIG. 7.

The lever 144 includes a portion 150 that extends over the top of the body 130. As will be discussed in more detail herein, an end 152 of the portion 150 engages and actuates the relief valve 140. The lever 144 further includes a second portion 154 that extends along the side of the body 130. In the illustrated embodiment, the lock member 146 couples to the second portion 154. In an embodiment, the lock member 146 includes a first arm 156 and a second arm 158 (FIG. 8). The arms 156, 158 each include a trunnion 160. The trunnions 160 engage recesses in the body 130 to define the axis 148. Extending along and extending past the side of the body 130 is a locking arm 162. The locking arm 162 includes a projection 164 on a distal end. In an embodiment, the projection 164 extends generally perpendicular to the locking arm 162 and includes a slot 166 that is sized to receive the projection 124 (FIG. 5). In the illustrated embodiment, the locking arm 162 is sized to extend past the bottom edge 168 (FIG. 7) of the body 160.

When the cover assembly 126 is placed on the tank 104 and rotated to engage the rib 120 into the slot 128, the angled surface 170 will contact the projection 122 causing the release assembly 142 to rotate about the axis 148 such that the projection 164 slides over the end of the projection 124 until the slot 166 aligns with the projection 124. When the slot 166 aligns with the projection 124, the release assembly 142 will rotate back under the influence of biasing member 172 (FIG. 9) causing the projection 124 to enter and engage the slot 166. It should be appreciated that the engagement of the projection 124 and the slot 166 prevents further rotation of the cover assembly 126. Since the ribs 120, 122 are engaged with the slot 128, the cover assembly 126 is coupled in sealing relationship with the tank 104 due to the mechanical coupling of the ribs 120, 122 with the slot 128 and the engagement of the o-ring 137 with the side wall 139 (FIG. 9) of tank 104 forms a pressure seal.

Figure 10:
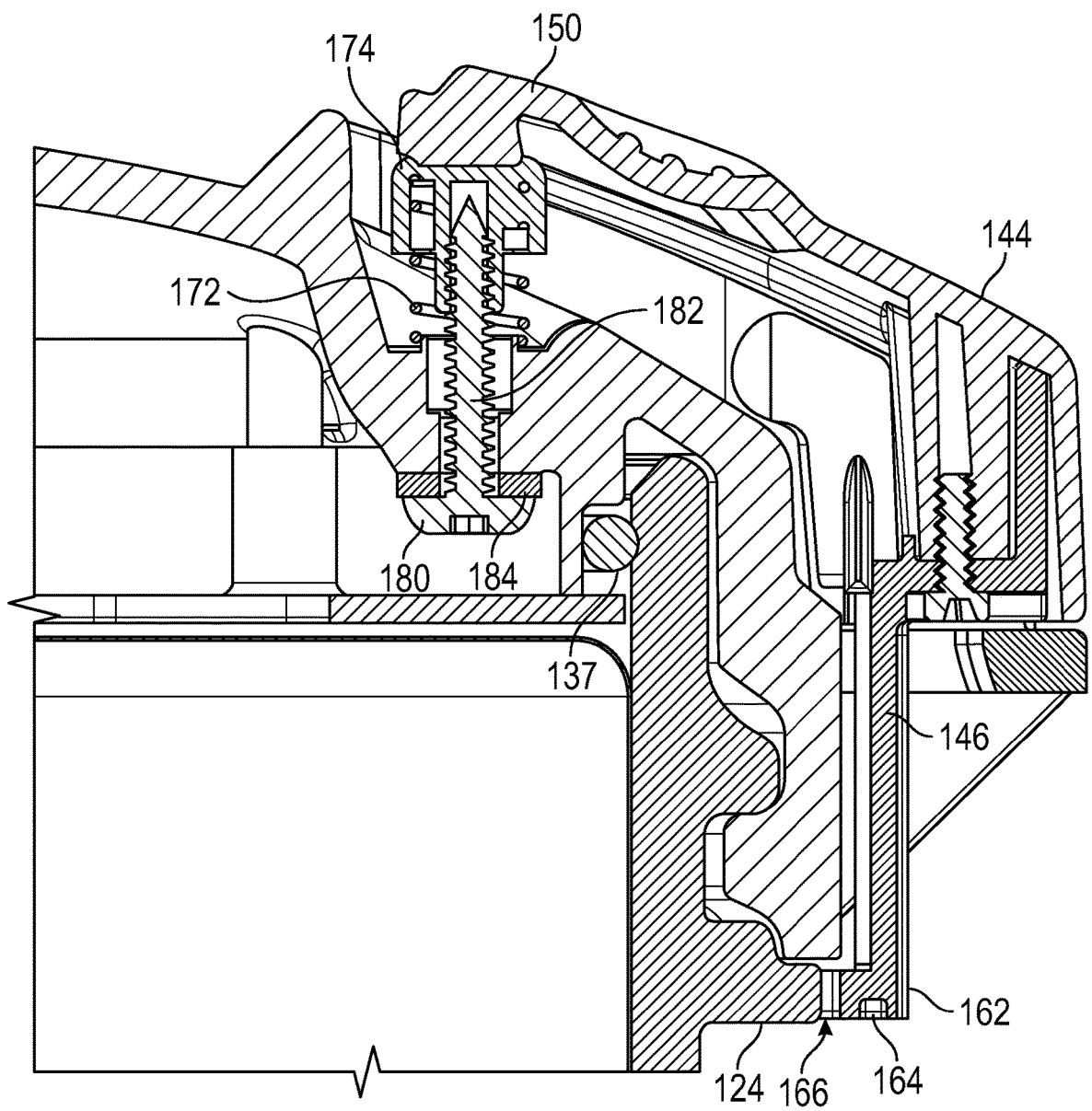
FIG. 10 is a partial side sectional view of the assembly of FIG. 9 with the release and lock assembly in an operating (closed or locked) position, in accordance with an embodiment.

The relief valve 140 includes a cap 174 that is disposed between the biasing member 172 and the end 152. Coupled to the cap 174 is a valve body 176 having a stem 178 and a head 180. In the illustrated embodiment, the stem 178 includes a thread that couples to an opening in the cap 174. In other embodiments, the stem 178 is coupled to the cap 174 via other fastening means, such as but not limited to a press fit or an adhesive for example. The stem 178 extends through an opening 182 in the body 130 to secure the relief valve to the cover assembly. In an embodiment, a seal member 184 is disposed between the head 180 and a surface 186 (FIG. 11) of the body 130. In one embodiment, the seal member 184 is coupled to the surface 186. In the illustrated embodiment, the seal member 184 is coupled to the head 180. The seal member 184 provides a seal between the head 184 and the body 130 when the relief valve 140 is in the closed position (FIG. 9, FIG. 10).

In operation, the operator couples the cover assembly 126 to the tank 104 as described above. A fluid source is coupled to one of the ports 106, 118 and an outlet conduit is coupled to the other of the ports 106, 118. The system 100 then operates by receiving fluid (e.g. water) from the input port, conditions the fluid by passing it through the purification media in module 112 and then providing the conditioned fluid to the outlet port. It should be appreciated that the operation of the system 100 pressurizes the interior volume of the system 100. This internal pressure increases the engagement force of the rib 120 on the slot 128. As a result, when the operator has finished using the system 100, the cover assembly 126 will be difficult or impossible to remove due to the internal pressure.

Figure 11:
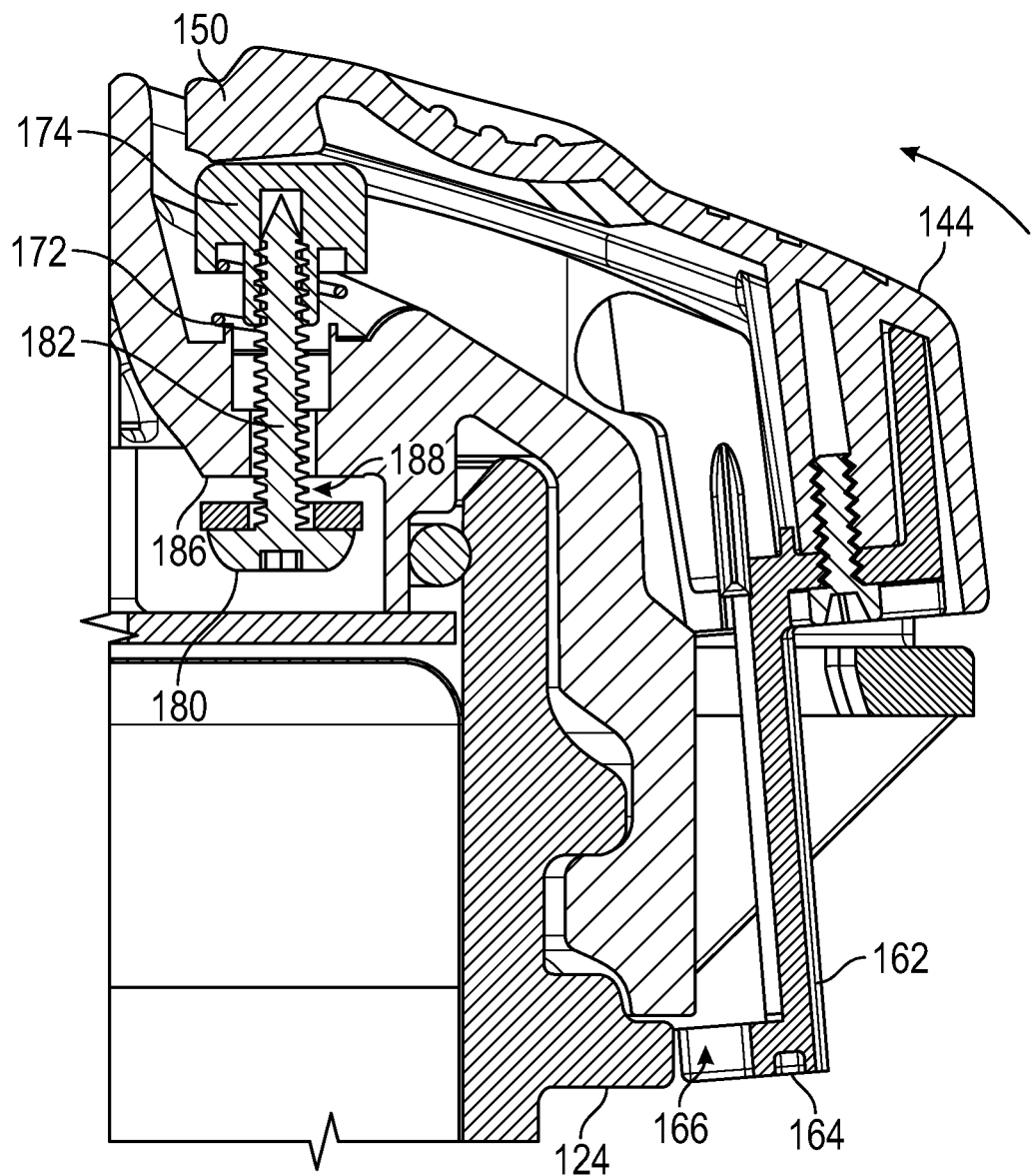
FIG. 11 is a partial side sectional view of the assembly of FIG. 9 with the release and lock assembly in a released and unlocked position, in accordance with an embodiment.

To resolve this, when the operator desires to remove the cover assembly 126, the operator press the portion 150 of the lever 144. The depression of the portion 150 causes two actions to occur simultaneously as is shown in FIG. 11. First, the depression of the portion 150 overcomes the biasing force of the biasing member 172 via the cap 174, resulting in the valve body 176 translating in a direction towards the base 105. This displaces the head 180 from the surface 186 generating a gap 188 allowing pressure within the interior volume of the system 100 to vent via the hole 182. Second, the depression of the portion 150 rotates the release assembly 142 (in the counter-clockwise direction when viewed from the position of FIG. 11). This rotation moves the locking arm 162 and the projection 164 away from the side wall of the tank 104 to disengage the projection 124 from the slot 166. With the slot 166 disengaged from the projection 124, the cover assembly 126 may be rotated until the rib 120 disengages from the slot 128 allowing the cover assembly 126 to be lifted off of the tank 104.

Referring now to FIGS. 12-15, another embodiment is shown of the cover assembly 126 that includes an air relief valve assembly 200. The cover assembly 126 includes a release assembly 142 that that is the same as that described herein with respect to FIGS. 7-11. In an embodiment, the relief valve 200 includes a valve member 202 that extends through an opening 204 in the cover. The opening 204 is sized to provide a gap between the inner diameter of the opening 204 and the outer surface of the valve member, such that in at least some positions of the relief valve, a flow path is defined between the hollow interior of the tank 104 and the environment.

The valve member 202 further includes a cup portion 206 on one end. In the illustrated embodiment, the cup portion 206 includes a cylindrical wall 208 that defines a recessed area 210. The opening of the recessed area 210 faces the hollow interior of the tank 104. A seal 212 is disposed between a top surface of the cup portion 206 and a surface 214 of the cover 127. In the illustrated embodiment, the seal 212 moves with the cup portion 206, such that when the valve member 202 is in a position other than closed (e.g. released or no water) then the seal 212 is offset from the surface 214 (FIG. 14 and FIG. 15) to expose the fluid path through the opening 204. It should be appreciated that while the cup portion 206 is illustrated with the recess 210, this is for exemplary purposes and the claims should not be so limited. In other embodiments, the cup portion may have other shapes, such as but not limited to a body having a flat or planar bottom surface, a convex bottom surface, a concave bottom surface, or any other suitably shaped bottom surface. In the exemplary embodiment, the valve member 202 is made from polypropylene and the seal 212 is made from a neoprene having a 60 durometer.

Figure 12:
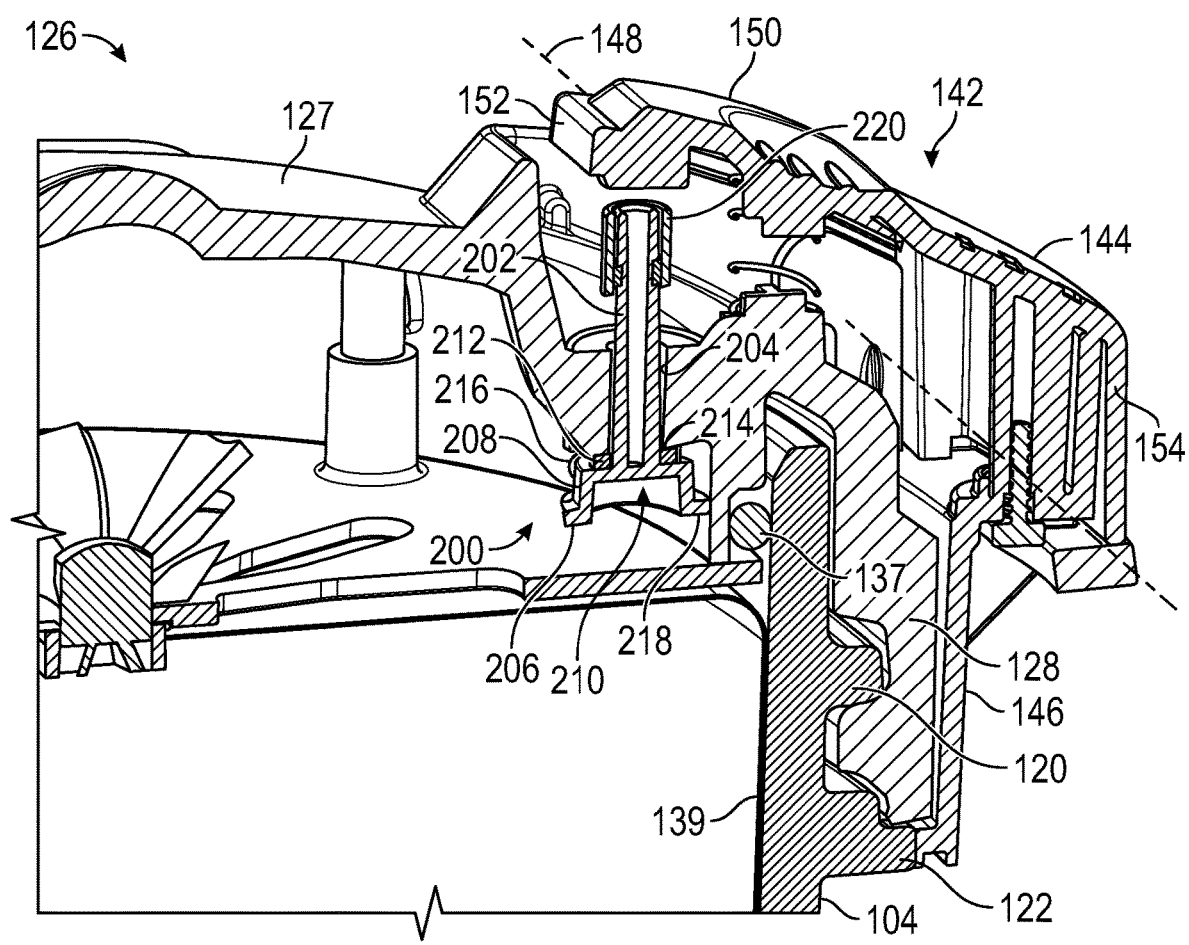
FIG. 12 is a partial sectional view taken along the line A-A of FIG. 3 with the release and lock assembly in an operating position, in accordance with another embodiment.

The valve member 202 is biased by a biasing member, such as compression spring 216. In an embodiment, the spring 216 is positioned between the surface 214 and a flange 218 on the cup portion 206. In the exemplary embodiment, the spring 216 is made from 316 stainless steel. The spring 216 is sized to apply a sufficient force to the flange 218 to move the valve member 202 to an open position (FIG. 14) when a water source is not connected to the system 100. The spring 216 is further sized such that when a fluid/water source is connected to the system 100, to fill the hollow interior of tank 104, valve member 202 will move from the open position to the closed position (FIG. 12). In other words, the valve assembly 200 is a normally open system that automatically closes whenever the fluid/water level 215 within the system 100 contacts the cup portion 206. In an embodiment, the spring force is between 1 gram to 900 grams with a surface area of the cup portion 206 to spring force is between 0.1 mm$^2$/gram-64 mm$^2$/grams. In another embodiment, the spring force is between 2 grams-450 grams with surface area of the cup portion to spring force is between 0.1 mm$^2$/gram-32 mm$^2$/gram. In still another embodiment, the spring force is between 5 grams and 100 grams with a surface area of the cup portion 206 to spring force is between 0.6 mm$^2$/gram-13 mm$^2$/gram. In still another embodiment, the spring force is about 21 gram and the surface area of cup portion 206 to spring force is about 3. In an embodiment, the surface area of the cup portion 206 is about 64 mm$^2$. As used herein, the surface area of the cup portion 206 is the lateral surface area that the fluid/contact/water pressure within the system 100 is acting upon.

Figure 13:
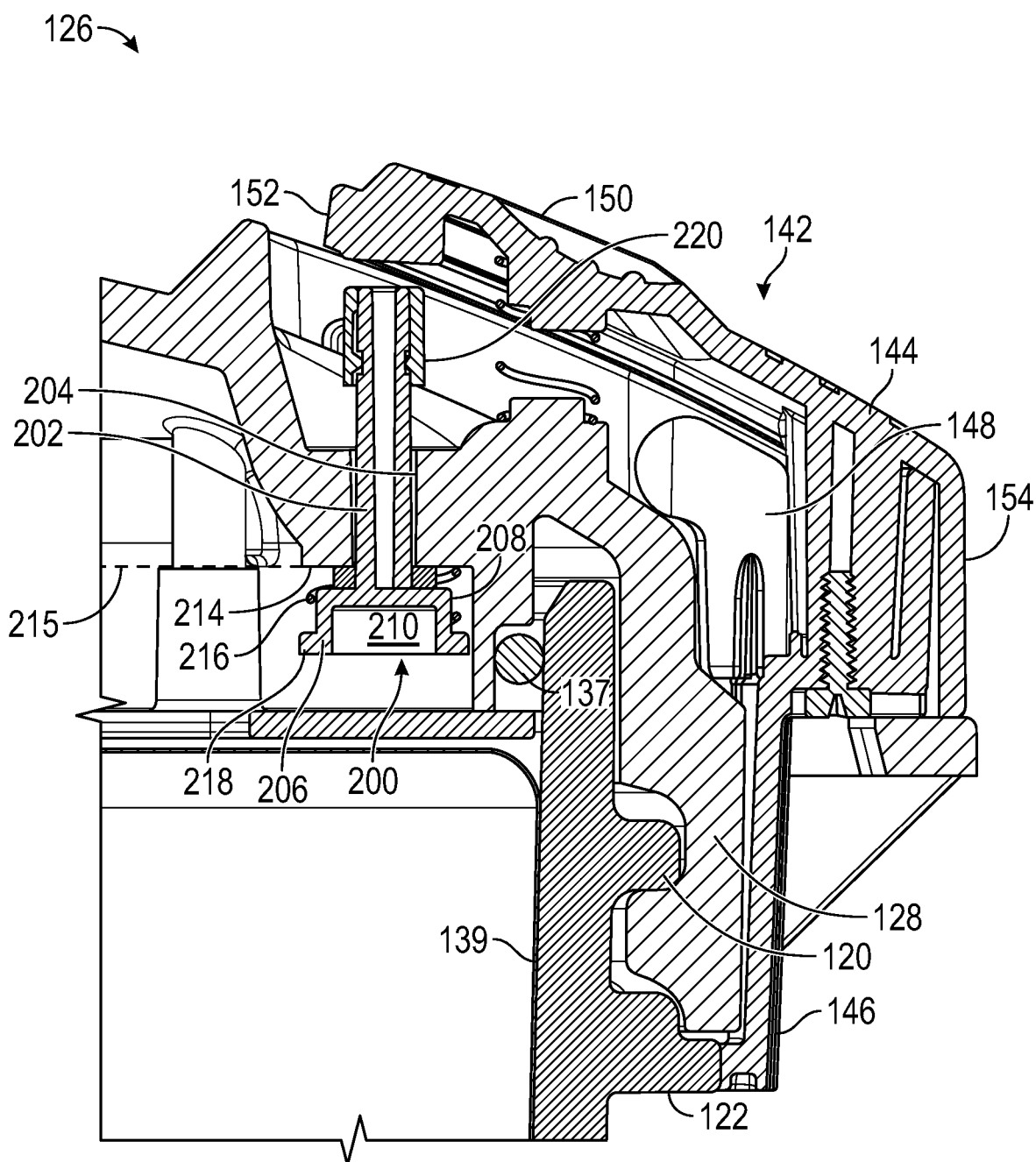
FIG. 13 is a side sectional view of the assembly of FIG. 12, with the release and lock assembly in an operating position.
Figure 14:
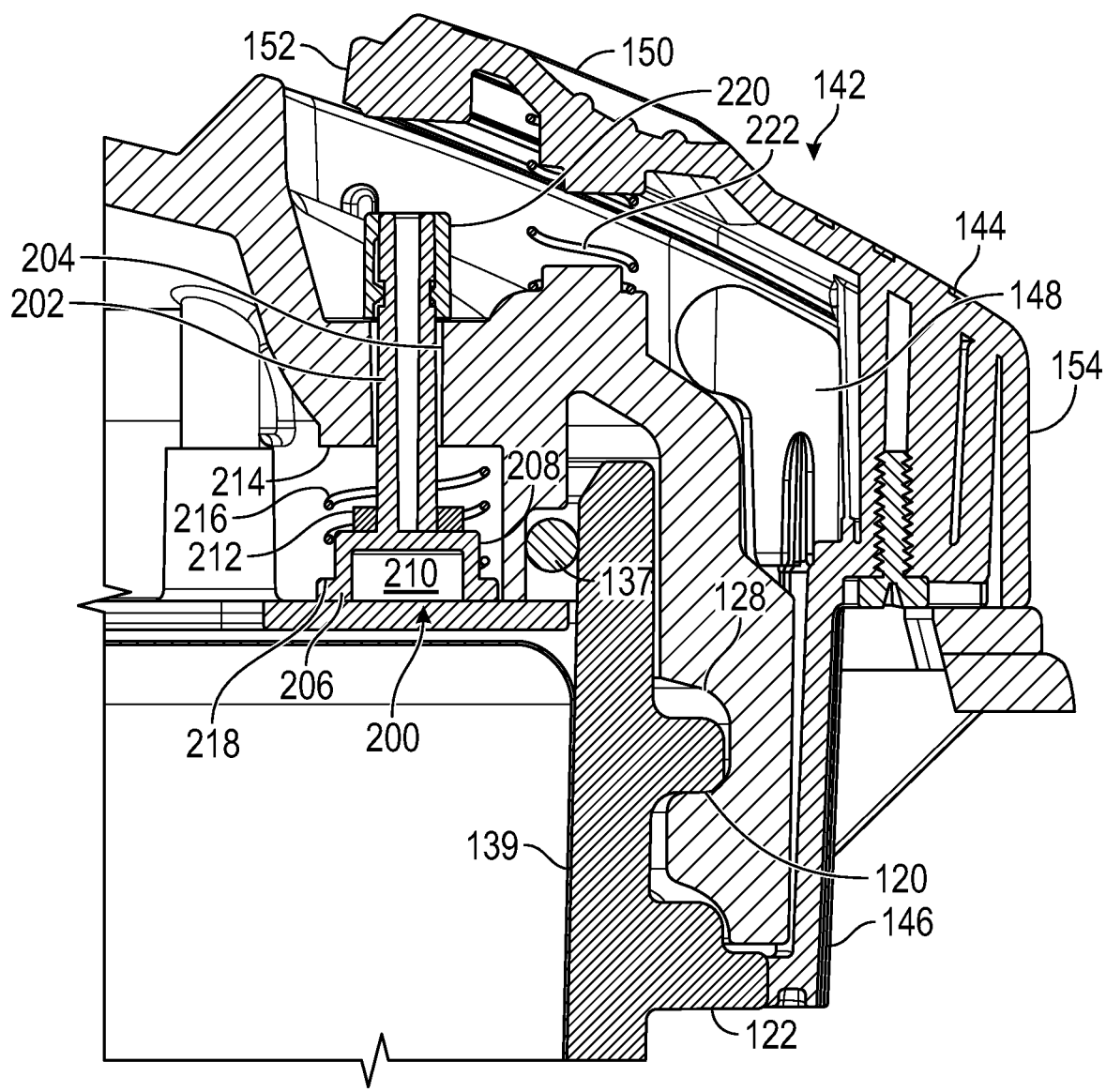
FIG. 14 is a side sectional view of the assembly of FIG. 12 with the release and lock assembly in a non-operational position.
Figure 15:
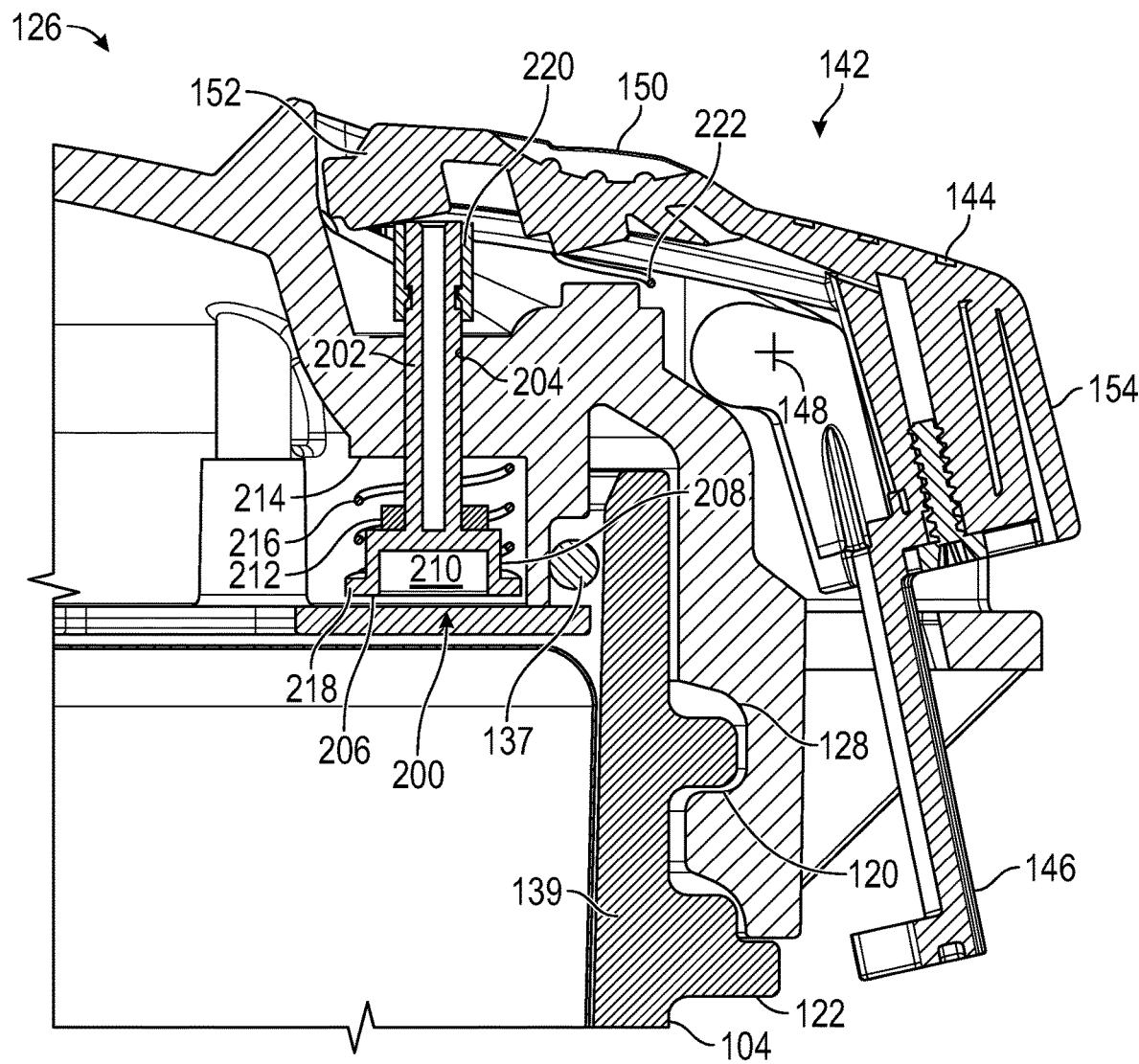
FIG. 15 is a side sectional view of the assembly of FIG. 12 with the release and lock assembly in a released and unlocked position.
Figure 16:
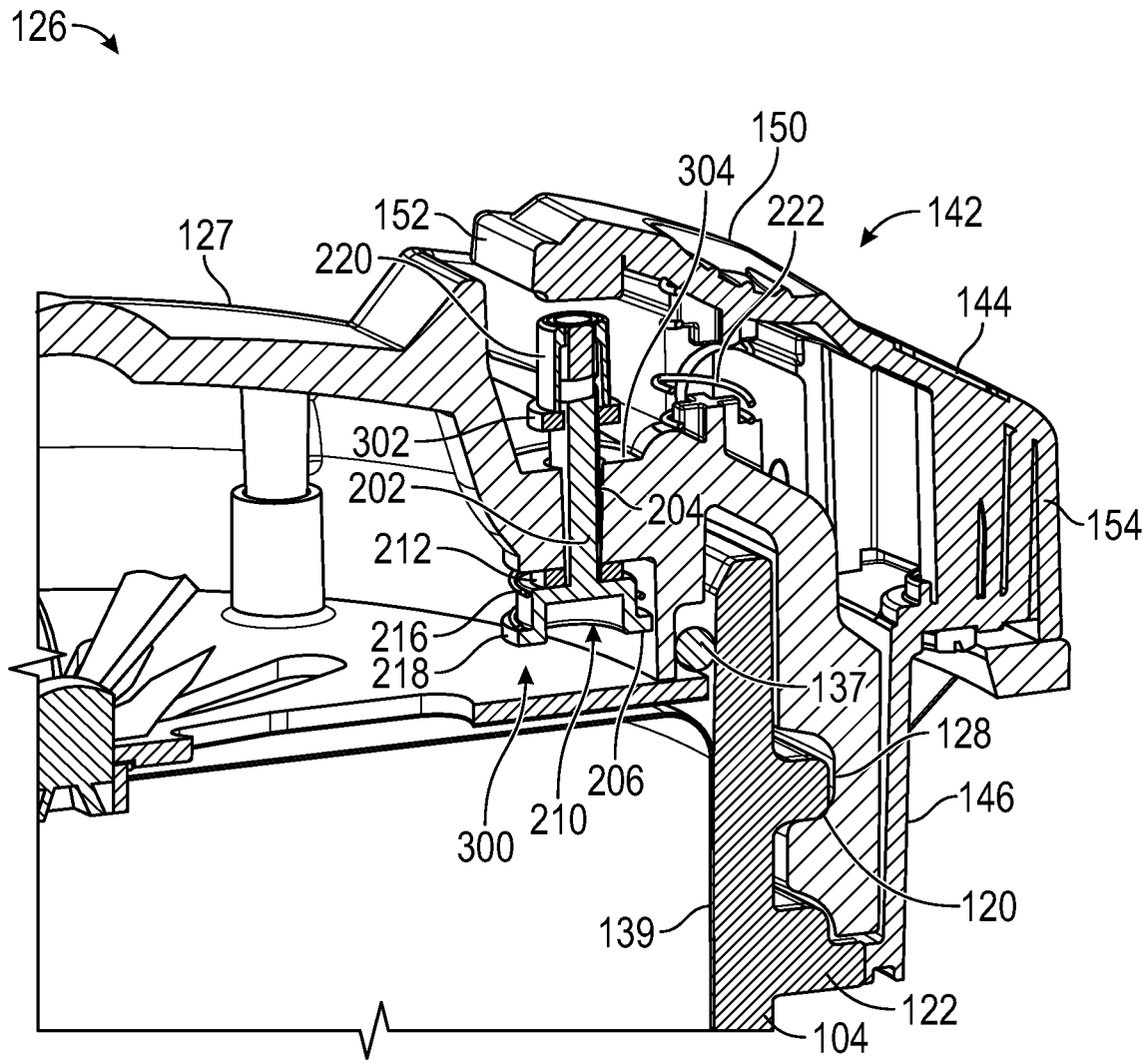
FIG. 16 is a partial sectional view taken along the line A-A of FIG. 3 with the release and lock assembly in an operating position, in accordance with another embodiment.
Figure 17:
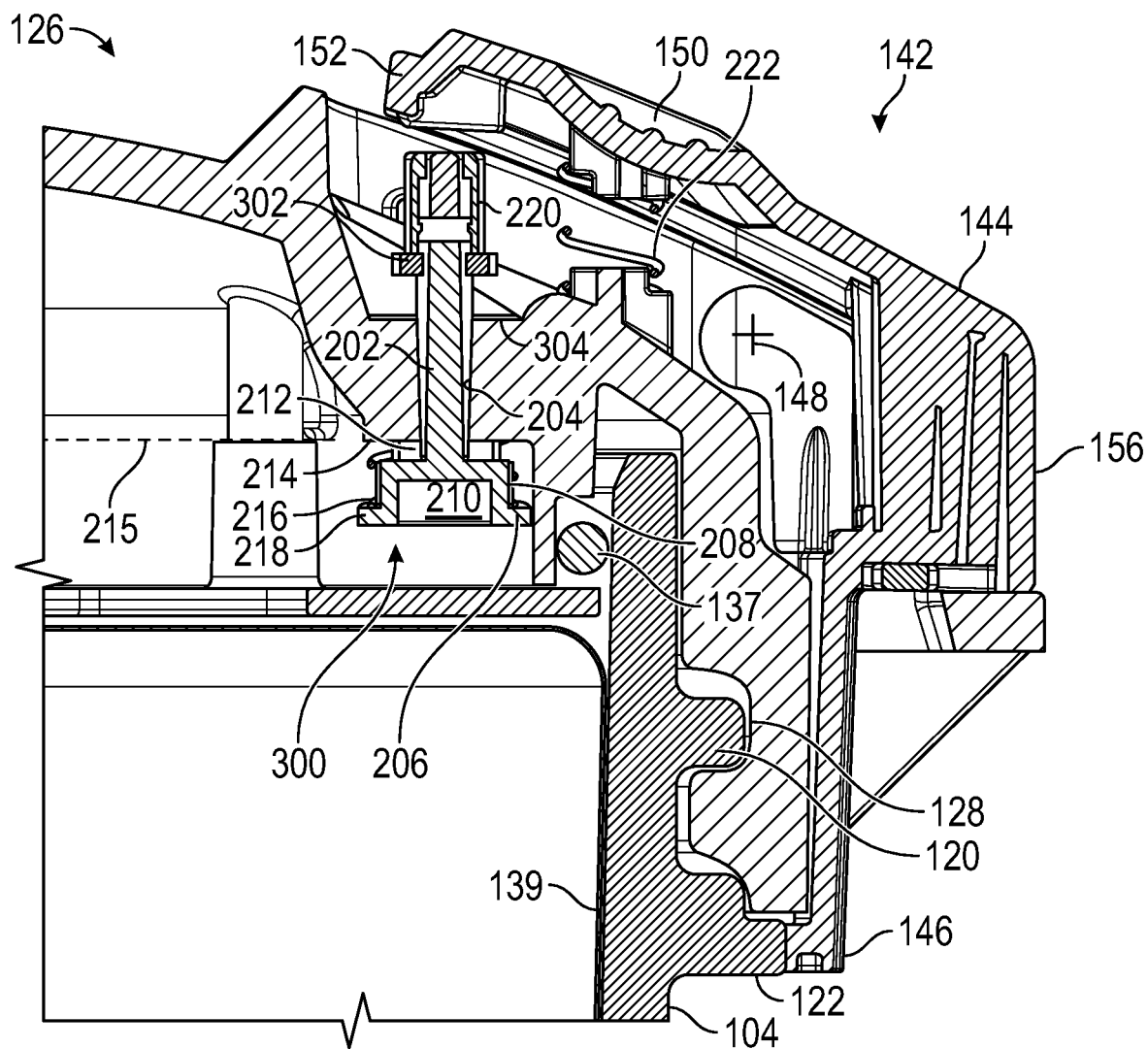
FIG. 17 is a side sectional view of the assembly of FIG. 16, with the release and lock assembly in an operating position.
Figure 18:
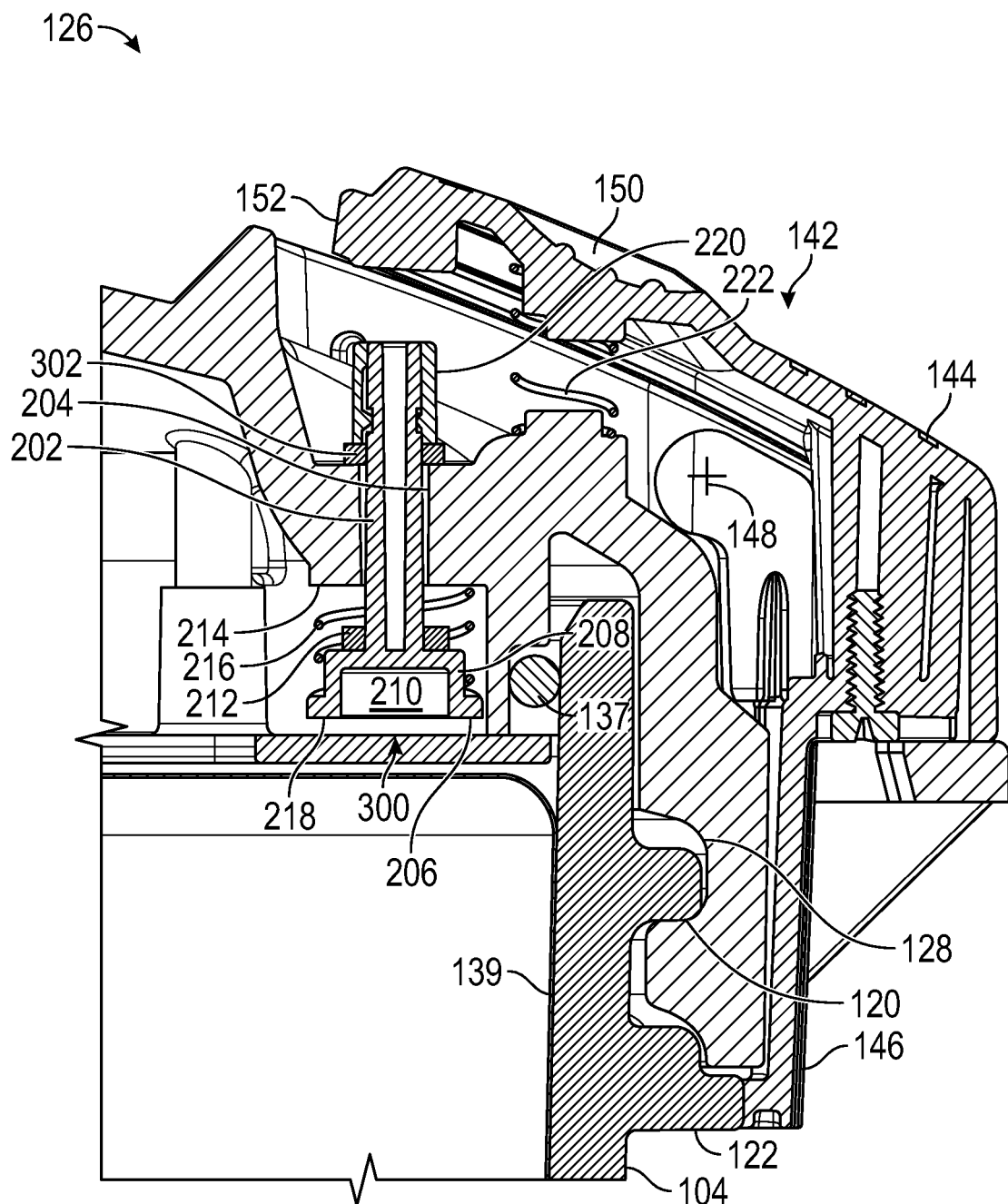
FIG. 18 is a side sectional view of the assembly of FIG. 16 with the release and lock assembly in a non-operational position
Figure 19A:
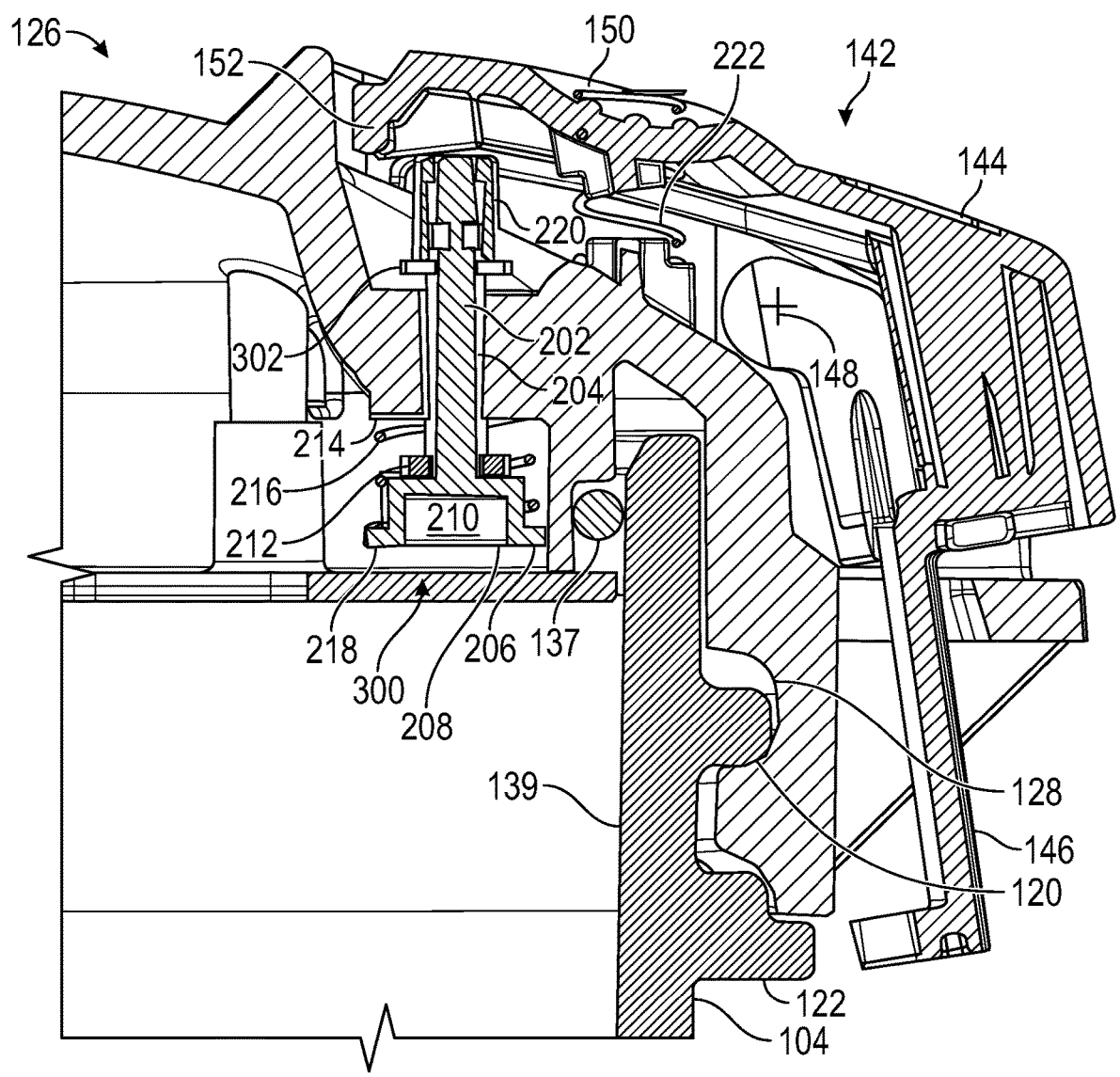
FIG. 19A is a side sectional view of the assembly of FIG. 16 with the release and lock assembly in a released and unlocked position.
Figure 19B:
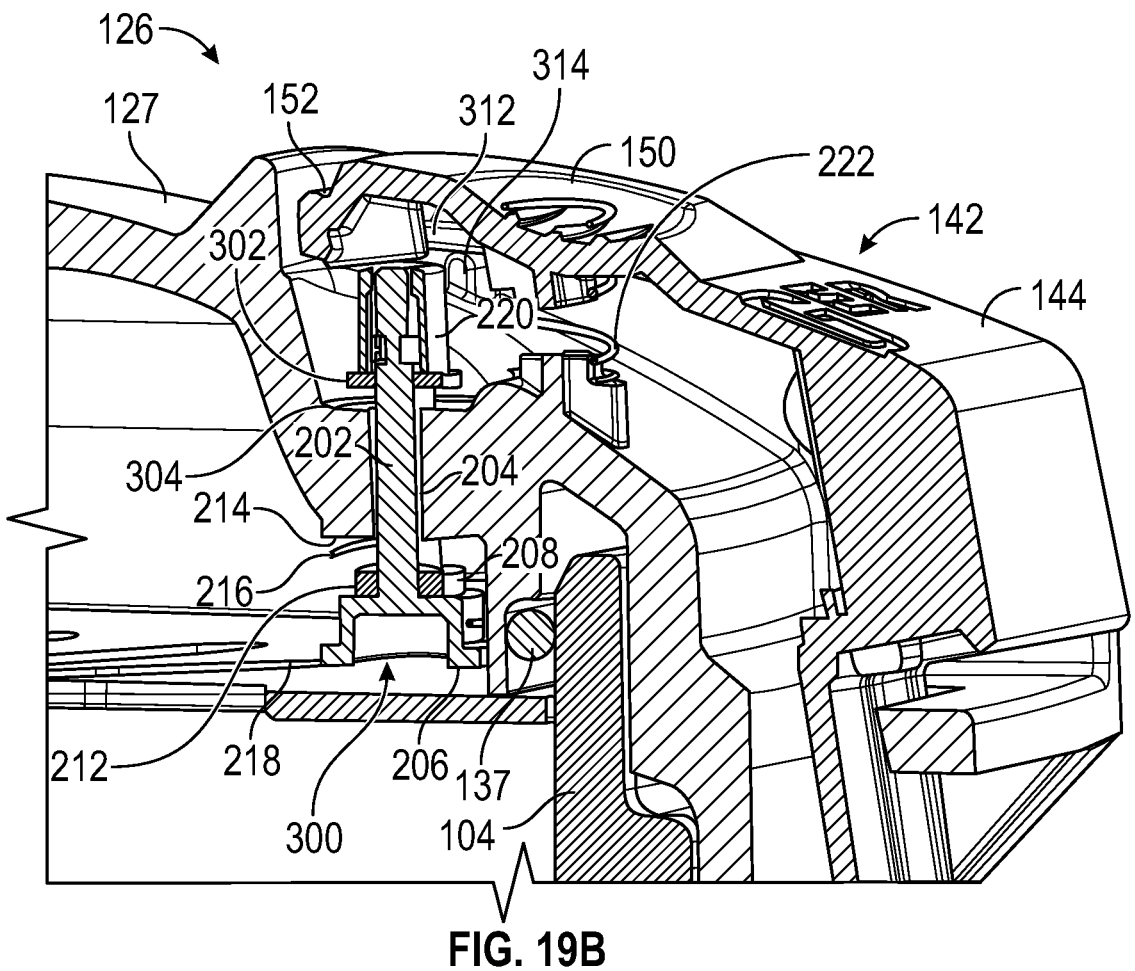
FIG. 19B is a perspective view, partially in section, of the assembly of FIG. 16 with the release and lock assembly in a released and unlocked position.

It should be appreciated that fluid/water level 215 embodiment illustrated in FIG. 13 is shown at its high level or operating level, as operation is initiated, the fluid/water level will start at the bottom of the tank 104 and gradually fill towards the cover 126. As the tank 104 fills, air within the tank 104 will vent through the opening 204. As the fluid/water level fills to a level that contacts the cup portion 206, the valve member 202 will move as the fluid/water level continues to rise until the fluid/water level 215 reaches approximately the surface 214. As this point, the valve member 202 moves into the closed or operating position and the opening 204 is sealed.

In an embodiment a cap 220 is coupled to an end of the valve member 202 on an end opposite the cup portion 206. In the exemplary embodiment, the cap 220 is made from polypropylene or a glass-filled polypropylene. The cap 220 is larger than the opening 204 and therefore limits the travel of the valve member 202 when the valve member 202 moves to the open position. In an embodiment, the cap 220 is coupled to the valve member 202 by a snap fit. In an embodiment, the cup portion 206 has sufficient surface area such that fluid/water contacting the cup portion 206 will overcome the biasing force of spring 216 and move the valve member 202 to the closed position. In an embodiment, the cup portion 206 may have a surface area between 5-400 mm$^2$. In some embodiments, the cup portion 206 may have a surface area between 20-120 mm$^2$. Without being limited to a particular theory, the overcoming of the biasing force of spring 216 may be due to the buoyancy of the valve member 202, the water contacting valve member 202, the water pressure of the fluid within the system 100, or a combination of the foregoing.

It should be appreciated that the operation of the system 200 causes the interior of system 100 to be at an elevated pressure level that causes an engagement between the slot 128 and the rib 120, and the with sufficient force to prevent the removal of the cover assembly 126. In accordance with an embodiment, the system 100 is configured to simultaneously release the internal pressure and disengage the slot 166 from the projection 124 (FIG. 7) to unlock the cover assembly 126 from the tank 104. First the user depresses the portion 150 causing the release assembly 142 to rotate about the axis 148. This causes the end 152 to engage the cap 220 and apply a force to the valve member 202. This force linearly displaces the valve member 202 towards the interior of the tank 104 and separates the seal 212 from the surface 214. This opens the fluid path between the opening 204 and the valve member 202 allowing pressure within the system 100 to vent to the environment and allow water to flow out of the system 100. Further, as the release assembly rotates, the slot 166 disengages from the projection 124 to allow the cover assembly 126 to be rotated by the user relative to the tank 104 and separated from the tank 104.

It should be appreciated that when the user releases pressure from the portion 150, the release assembly 142 rotates back to the original position due to the biasing force of spring 222. Further, when the release assembly 142 is released by the user, the valve assembly 200 will move to the non-operational position (FIG. 14) with the cup portion 206 and the seal 212 offset from the surface 214 under the biasing force of spring 216. It should be appreciated that while embodiments herein describe the seal 212 as being coupled to or moving with the cup portion 206, this is for exemplary purposes and the claims should not be so limited. In other embodiments, the seal 212 may be coupled to the surface 214 and the seal is formed when the top surface of the cup portion moves into contact with the seal 212 in the closed position.

It should be appreciated that in some embodiment, the venting of the air pressure within the system 100 may also include fluid/water particles that are ejected through the opening 204 due to the pressure. In an embodiment, the lever 144 is sized to extend over the opening 204 sufficiently to shield the user from water/fluid being sprayed from the system 100.

Referring now to FIGS. 16-19B, another embodiment of a valve assembly 300 is shown. The valve assembly 300 is the same as valve assembly 200 with the addition of a second seal 302 disposed between the cap 220 and a surface 304 of the cover 127. In the illustrated embodiment, the second seal 302 moves with the cap 220 such that when the system 100 is in the released (FIG. 19A) or non-operating/no-water (FIG. 18) positions, the second seal 302 engages the surface 304 and seals the opening 204. Similar to valve assembly 200, when the valve assembly 300 is in the closed position, the seal 212 engages the surface 214 and the opening 204 is closed to the interior of the tank 104.

In an embodiment, the rotation of the release assembly 142 is limited to prevent the second seal 302 from contacting the surface 304 and sealing the opening 204. In an embodiment, the lever 144 includes at least one rib 312 (FIG. 19B) that extends along a side of the lever 144. In the illustrated embodiment, the lever 144 includes two ribs that extend along opposite sides of the lever 144. The rib 312 extends downward from the main body of the lever and is positioned to engage a projection 314 that extends from the surface of the cover 127 in an area beneath the lever 144. The projection 314 and rib 312 cooperate to stop the rotation of the lever 144 at a point where there is a gap 316 between the seal 302 and the surface 304. It should be appreciated that the gap 316 allows the pressure within the interior of system 100 to continue venting when the release assembly 142 is in the released position.

In some embodiments, the system 100 may include a purification media 133 (FIG. 20A) that includes a volume of moisture and it is desirable to maintain the media with a predetermined level of moisture content. The incorporation of the second seal 302 (FIG. 18) provides advantages in preventing or reducing the risk of moisture or another fluid from evaporating or leaking from the interior of the tank 104 and purification media 133 when the system 100 is not in use, such as for example, when the system 100 is in transit or being shipped.

Embodiments provided herein provide for a fluid conditioning system having a pressure release arrangement. Embodiments provided herein further provide for a fluid conditioning system having a lock that couples a cover assembly to a tank. Still further embodiments provided herein further provide for a release assembly that simultaneously releases pressure from an internal volume and unlocks the cover assembly from the tank.

It should further be appreciated that while embodiments herein may refer to features with respect to an embodiment, this is for example purposes and it is contemplated that the features may be combined with other disclosed embodiments.

The term "about" is intended to include the degree of error associated with measurement of the particular quantity based upon the equipment available at the time of filing the application. For example, "substantially" or "about" can include a range around a given value.

It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A fluid purification device comprising:
   a tank having a hollow interior;
   a cover sealingly coupled to the tank; and
   a release assembly pivotally coupled to the cover, the release assembly having a relief valve fluidly coupled to the hollow interior, the release assembly being movable between a first position and a second position, the relief valve being movable between a closed operating position, an open released position and an open non-operational position, wherein the relief valve is movable from the non-operational position to the operating position in response to a fluid within the hollow interior and movable from the operating position to the released position in response to the release assembly pivoting from the first position to the second position.

2. The device of claim 1, wherein:
   the tank includes a lock feature;
   the release assembly includes a lock member that is engaged with the lock feature in the operating position and non-operating position, the lock member being rotated away from and disengaged from the lock feature in the released position; and
   the relief valve opens and the lock member disengages simultaneously when the release assembly rotates from the operating position to the released position.

3. The device of claim 2, further comprising:
   a lever coupled between the lock member and the relief valve, the lever having a portion operably coupled to the relief valve; and
   wherein the relief valve further includes a valve member having a cup portion disposed on a first end, and an opposing second end of the valve member being in selective engagement with the lever.

4. The device of claim 3, further comprising a first seal member operably disposed between the cup portion and one of the cover or tank, the first seal member being in sealing engagement with the cup portion and the one of the cover or tank when in the operating position.

5. The device of claim 4, further comprising:
   a cap member coupled to the second end; and
   a second seal member operably disposed between the cap member and the one of the cover or tank, the second seal member being in sealing engagement with the one of the cover or tank when in the non-operational position and the released position.

6. The device of claim 3, wherein the cup portion includes a recessed area on one end, the recessed area having an opening that faces the hollow interior of the tank.

7. The device of claim 3, further comprising a biasing member coupled between the cup portion and the cover, the biasing member biasing the valve member into the non-operational position.

8. The device of claim 7, wherein the biasing member applies a force of between 1-900 grams to the valve member.

9. The device of claim 8, wherein the biasing member applies a force between 2-450 grams to the valve member.

10. The device of claim 9, wherein the biasing member applies a force between 5-100 grams to the valve member.

11. The device of claim 9, wherein the biasing member applies a force about 21 grams to the valve member.

12. The device of claim 7, wherein the ratio of surface area of the cup portion to a spring force of the biasing member is between 0.1-64 mm$^2$/gram.

13. The device of claim 12, wherein the ratio of the surface area of the cup portion to the spring force is between 0.1-32 mm$^2$/gram.

14. The device of claim 13, wherein the ratio of the surface area of the cup portion to the spring force is between 0.6-13 mm$^2$/gram.

15. The device of claim 14, wherein the ratio of the surface area of the cup portion to the spring force is about 3 mm$^2$/gram.

16. A fluid purification device comprising:
   a tank having a hollow interior;
   a cover sealingly coupled to the tank, the cover having a hollow interior portion;
   a lever movably coupled to an outer surface of one of the cover or the tank;
   a relief valve operably coupled to the lever, the relief valve having a valve member with a cup portion disposed on an end and arranged within the hollow interior portion, the relief valve defining a fluid path between the hollow interior and an environment when in an open position; and a biasing member operably coupled to the relief valve, the biasing member biasing the valve member to the open position when the hollow interior is not in a pressurized operating condition and wherein the valve member moves to a closed position and compresses the biasing member in response to the hollow interior being in a pressurized operating condition.

17. The fluid purification device of claim 16, further comprising a first seal member operably disposed between the one of the cover or tank and the cup portion, the first seal member sealing the hollow interior from the environment when the hollow interior is in the pressurized operating condition.

18. The fluid purification device of claim 17, wherein a release assembly comprises the lever and further includes a cap coupled to an end of the valve member opposite the cup portion.

19. The fluid purification device of claim 18, further comprising a second seal operably disposed between the one of the cover or tank and the cap.

20. The fluid purification device of claim 16, wherein the biasing member applies a force of between 1-900 grams to the valve member.

21. The device of claim 20, wherein the biasing member applies a force between 2-450 grams to the valve member.

22. The device of claim 21, wherein the biasing member applies a force between 5-100 grams to the valve member.

23. The device of claim 22, wherein the biasing member applies a force about 21 grams to the valve member.

24. The device of claim 16, wherein the ratio of surface area of the cup portion to a spring force of the biasing member is between 0.1-64 $mm^2$/gram.

25. The device of claim 24, wherein the ratio of the surface area of the cup portion to the spring force is between 0.1-32 $mm^2$/gram.

26. The device of claim 25, wherein the ratio of the surface area of the cup portion to the spring force is between 0.6-13 $mm^2$/gram.

27. The device of claim 26, wherein the ratio of the surface area of the cup portion to the spring force is about 3 $mm^2$/gram.

* * * * *